US011280872B1

(12) United States Patent
Godil et al.

(10) Patent No.: US 11,280,872 B1
(45) Date of Patent: Mar. 22, 2022

(54) LOCATION TRACKING USING ONE OR MORE BEACONS

(71) Applicant: SEE XYZ, INC, Fremont, CA (US)

(72) Inventors: Asif Godil, Pleasanton, CA (US); David M. Bloom, Monterey, CA (US)

(73) Assignee: SEE XYZ., INC., Fremont, CA (US)

( * ) Notice: Subject to any disclaimer, the term of this patent is extended or adjusted under 35 U.S.C. 154(b) by 121 days.

(21) Appl. No.: 16/781,387

(22) Filed: Feb. 4, 2020

Related U.S. Application Data

(60) Provisional application No. 62/869,219, filed on Jul. 1, 2019, provisional application No. 62/801,088, filed on Feb. 4, 2019.

(51) Int. Cl.
  *G01S 1/70* (2006.01)
(52) U.S. Cl.
  CPC ................ *G01S 1/7038* (2019.08)
(58) Field of Classification Search
  CPC ........ G01S 1/7038; G01S 1/7034; G01S 1/70; G01S 5/163
  See application file for complete search history.

(56) References Cited

U.S. PATENT DOCUMENTS

| | | | |
|---|---|---|---|
| 6,266,142 B1 * | 7/2001 | Junkins | G01S 1/7038 356/623 |
| 7,421,338 B2 * | 9/2008 | Kim | G05D 1/0234 701/514 |
| 8,643,850 B1 * | 2/2014 | Hartman | B66C 13/085 356/614 |
| 9,223,008 B1 * | 12/2015 | Hartman | B66C 13/085 |

(Continued)

*Primary Examiner* — Sang H Nguyen
(74) *Attorney, Agent, or Firm* — Vorys, Sater, Seymour and Pease L.L.P

(57) ABSTRACT

A location tracking system using encoded light beams emitted from a stationary beacon and a receiver mounted onto an object within a three-dimensional (3D) space within the field of view of the stationary beacon. The receiver receives and processes the encoded light beams from two or more stationary beacons. The receiver is configured to decode information from the received light beams and to calculate the position of the object within the 3D space over a span of several meters, with resolution in the range of a few mm or cm. The receiver location is calculated as a single point at the intersection of three light beam or angular planes. A typical configuration of one-dimensional array beacon consists of a plurality of light sources mounted on a cylindrical curved surface of a particular radius. A vertical apodizing slit placed at the center of the circular curve limits the horizontal angular profile of encoded light beams as can be seen or received by the receiver in the far field to roughly 1-5 encoded light beams at a time. Each light source emits a light beam encoded with a unique code that allows the receiver to identify the light source that emitted the light beam. Certain signal processing techniques allow the receiver to detect, process, and decode information from the light beam including light intensity profile of each received light beam. This information is used by the receiver to infer a point where the receiver is located at the intersection of three angular planes where it is located relative to the beacons, and thus the location of the object is fully determined in 3D space.

20 Claims, 15 Drawing Sheets

Optical Location Tracking System 200

(56) References Cited

U.S. PATENT DOCUMENTS

| | | | |
|---|---|---|---|
| 2006/0209541 A1* | 9/2006 | Peck | F21V 5/04 |
| | | | 362/247 |
| 2007/0211239 A1* | 9/2007 | Mandella | G06F 3/0423 |
| | | | 356/138 |
| 2015/0109612 A1* | 4/2015 | Ellison-Marion | G01S 17/48 |
| | | | 356/72 |
| 2017/0086079 A1* | 3/2017 | Gu | H04W 4/027 |

* cited by examiner

Frontal, Side, and Perspective Views of Two-Dimensional Beacon 700

Frontal Perspective view of 2D Beacon 1000

Architype Arrangement of LEDs 1050

LOCATION TRACKING USING ONE OR MORE BEACONS

This application is a continuation claims priority and the benefit of U.S. Prov. Pat. Appl. No. 62/801,088 filed on 4 Feb. 2019 and claims priority and the benefit of U.S. Prov. Pat. Appl. No. 62/869,219 filed on 1 Jul. 2019. Each of the above applications is hereby incorporated herein by reference in its entirety.

FIELD OF INVENTION

The present invention relates generally to location tracking and more specifically to location tracking of a movable object within a three-dimensional space using multiple arrays of light sources.

BACKGROUND

Many electronic systems nowadays can make use of location tracking in three-dimensional space to improve systems' performance or to provide a value add for the user. Location tracking, however, is an essential part of augmented reality (AR) systems and it is required to provide real-time user's location to AR based systems. Various techniques have been attempted to provide some type of location tracking by means of remote sensing applications using optical, video, ultrasonic, or magnetic sensing equipment, wherein a user's movement is located with respect to a controlled environment within which a controlled object may move. For example, some AR systems make use of a video image of the user's environment that is captured and identify real-world objects using known object recognition algorithms, or pre-programmed points to retrieve information based on the identified objects, and then a video image of the user within the same environment can yield an approximate location of the user and provide the information to the application. For example, a combined display of a virtual image of the physical scene and information related to the identified objects may be created and a tracking system may detect the user's eye movement and/or head movement to determine the user's field of view of the environment so that a computer-generated virtual image may be tracked with a selected object, such as a wall, floor or circuit board, and its location is tracked by the computer as the user's field of view changes. By tracking the movement of the user, the external equipment can compare the user's movement to a known or predetermined location of items within the field of view to determine the user's location within the environment.

In addition, by identifying the location of real-world objects, computer-generated virtual images may then be tracked with the selected object in the display of the environment. Such systems, however, would require a large amount of real time computer processing power and may require a costly and/or heavy tracking system to be worn by the user. Moreover, such systems also require knowledge or remote sensing of various objects in the environment in order to provide accurate tracking of a user with respect to the objects around him. Such augmented reality (AR) systems, however, do not allow tracking of a user to an arbitrary object or environment. Three-dimensional location tracking is used in system such as in gaming, virtual reality, augmented reality, robotics and automation systems. The design and performance of such systems is drastically limited with unreliable or inefficient three-dimensional location tracking.

Therefore, there is a need for a reliable and cost-effective three-dimensional location tracking of an arbitrarily movable user or an arbitrarily movable object within a three-dimensional space.

DETAILED DESCRIPTION

Figure 1:
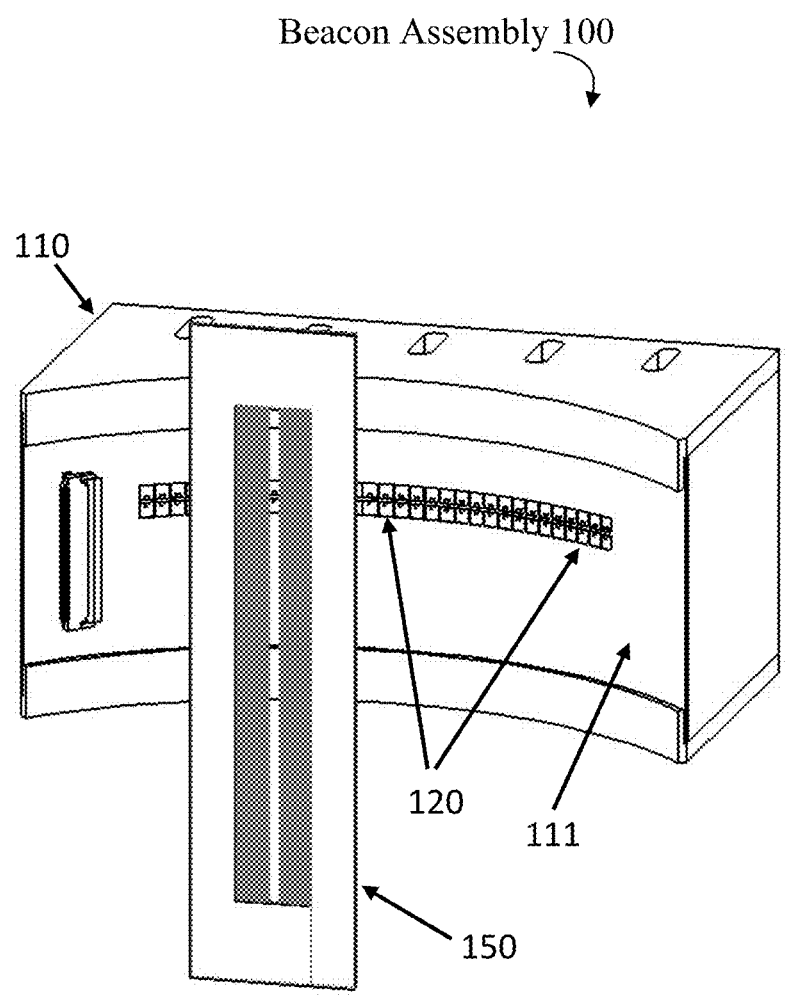
FIG. 1 is a perspective view of a beacon.
Figure 2:
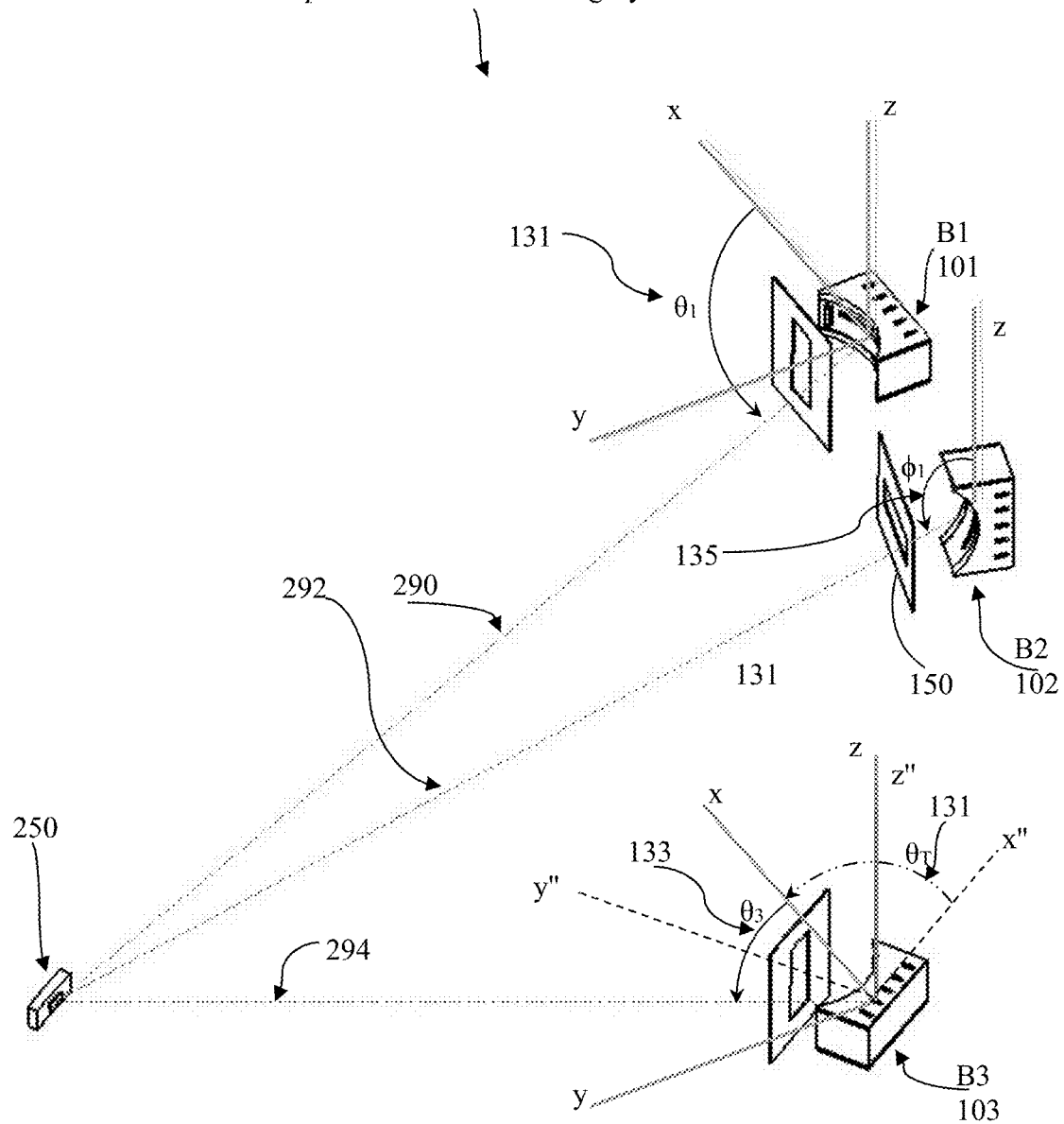
FIG. 2 illustrates an optical location tracking system using multiple beacons and one receiver.

FIG. 1 shows a perspective view of a beacon assembly 100 that can be used in conjunction with additional units of beacon assembly 100 to form an optical location tracking system 200 as illustrated in FIG. 2. The beacon assembly 100 includes an illuminating block 110 positioned behind an apodizing slit 150. The illuminating block 110 includes a plurality of light sources 120 mounted along a cylindrical surface 111 of the illuminating block 110. In one embodiment, the plurality of light sources 120 includes a specific number of light sources each of which emits a light beam establishing an angular plane within a three-dimensional space. A freely movable object may cross an angular plane as it moves and thus, knowing which angular plane the movable object intersected while moving provides information that is used by the optical location tracking system 200 to track and locate the movable object.

For example, the plurality of light sources 120 may include any number of light sources and in this example thirty-two light sources are used. Other configurations may use 16 or 64 light sources or any other number of light sources in accordance with at least a desired granularity in tracking the movement of an object within a given three-dimensional space. The apodizing slit 150 is positioned in front of the light sources so as to constrain all the light beams emitted by each light source of the plurality of light sources 120 such that the only light emitted from the beacon assembly 100 is what is emitted through the apodizing slit 150. Each light beam emitted from each light source through the apodizing slit 150 forms an angular plane of light within the three dimensional-space. Thus, a receiver located at a first point within the three-dimensional space may intersect few (approximately 3 or 5) of the angular plane of lights, hence, the receiver located at the first point would only receive few (approximately 3 or 5) of the light beams emitted by the beacon. Therefore, a desired one-dimensional tracking granularity or accuracy of the movable object within the three-dimension space is directly related to the number of angular planes of light beams, emitted through the apodizing slit 150 of one beacon assembly 100, that may be intersected by a receiver mounted onto a moving object within the three-dimensional space.

For any given three dimensional space, the larger the number of angular planes that a movable object may intersects and detects as it moves along one dimension, the higher the tracking granularity or accuracy along that dimension. Thus, using more light sources generally allows for greater accuracy in tracking the object and also reduces the need for interpolating position of the object between angular planes emitted by two neighboring light sources. The ability to detect which angular plane the movable object crossed will be further discussed below.

In one embodiment, the plurality of light sources 120 are mounted along the cylindrical surface 111, as shown in FIG. 1, and the apodizing slit 150 is positioned in front of the illuminating block 110 and at the focal point of the arc of the cylindrical surface 111. For example, the apodizing slit 150 may be positioned at the geometric center of the cylindrical surface 111 or at a focal point of the plurality of light sources 120. In another embodiment, the apodizing slit 150 may be positioned at a designated geometric point that is located at a certain offset from a focal point of the cylindrical surface 111 or the plurality of light sources 120.

The plurality of light sources 120 can be Light Emitting Diodes (LEDs), but other types of light sources having specific beam emission characteristics may be used. A light source as used here refers to any electromagnetic radiation source, e.g. an infrared light source, ultraviolet light source, or any source radiating electrically charged particles. Given a desired performance and cost of the location tracking system certain types of electromagnetic radiation sources producing beams having specific wavelength and physical characteristics may be used.

The plurality of light sources 120, as illustrated in FIG. 1, form a one-dimensional array of light sources and are mounted along a horizontal latitude of the cylindrical surface 111. The apodizing slit 150 is mounted vertically and limits the angular spread of beam emission from each light source in the horizontal direction. Each light beam emerging from the apodizing slit 150 resembles a vertical sheet or a plane of light and will be referred to as an angular plane. Thus, in this example and at a given position in the horizontal direction, along which an object is moving within a three-dimensional space located in front of the beacon assembly 100, the object may intersect one or more of the angular planes and a receiver mounted on the moving object may detect one or more of the light beams emitted from the beacon and corresponding to respective one or more light sources of the plurality of light sources 120. In one embodiment, the moving object may intersect one of the angular plane of lights at a first location, while the receiver mounted onto the moving object may receive and detect approximately three to five of the light beams emitted from the beacon at that first location.

The narrowing of the field of view due to the apodizing slit 150 enables the receiver at a given location, within the three dimensional space in front of the beacon assembly 100, to receive at least one specific light beam having an angular direction that corresponds to where the receiver is positioned within the three dimensional space in front of the beacon assembly 100. In one embodiment, a uniquely encoded electrical signal is used to drive each light source of the plurality of light sources 120, and hence each light source emits a uniquely encoded light beam. The unique encoding system—which may be a Pseudo Noise (PN) code, Pseudo Random Noise (PRN) code, maximal length or M-sequence, Manchester code, or any other suitable orthogonal code—may include identification information about the light source such as its position, angular direction, and/or the beacon assembly. For example, a movable object includes a receiver that is configured to receive, detect and process about three to five light beams while the object is moving within a given three-dimensional space. The receiver is further configured to extract the uniquely encoded information from each light beam received which can effectively identify which light sources of the plurality of light sources 120 emitted the received or detected light beams.

In one embodiment, an optical location tracking system 200, as illustrated in FIG. 2, identifies an angular plane corresponding to the received light beam using the uniquely encoded information extracted from the received light beam. This extracted information identifies the location (or mounting position) of the light source on the cylindrical surface 111 of the beacon assembly 100. Thus, allowing the optical location tracking system 200 to deduce the angular direction along one-dimension where the receiver is located within the three-dimensional space in front of the beacon assembly 100. The accuracy of deducing the angular plane where the receiver is positioned depends on the number of light sources mounted onto the beacon assembly 100. For example, at a certain position within the three dimensional space, more than one light beam from one beacon assembly 100 may be received and detected. The receiver is configured to extract at least intensity information and the uniquely encoded information from each light beam received. Therefore, the receiver would perform computations and extrapolations to deduce an angular direction corresponding to where the receiver is located along the one-dimensional direction with respect to beacon assembly 100, this provides the basis of tracking and locating a movable object in one-dimension. Consequently, combining the use of three such beacon assemblies affords the optical location tracking system 200 enough information to calculate a precise position of the receiver mounted onto the movable object at the intersection of three angular planes each of which is deduced from one of three beacon assemblies as will be discussed in further details below.

In one embodiment, an optical location tracking system 200 using multiple beacons and one receiver 250 is shown in FIG. 2. The receiver 250 is to be mounted onto a movable object which is not shown in FIG. 2 for clarity. The receiver 250 is shown in a first position relative to multiple stationary beacon assembly 100. A first beacon assembly 101 (B1) and a second beacon assembly 102 (B2) each of which includes a plurality of light sources 120 mounted onto a cylindrical surface 111 as described above. The first beacon assembly 101 (B1) is positioned perpendicular to the second beacon assembly 102 (B2). Hence, the first beacon assembly 101 (B1) emits a first plurality of encoded light beams defining a first set of angular planes and a second plurality of encoded light beams defining a second set of angular planes that are perpendicular to the first set of angular planes. Each of the dashed lines extended between the receiver 250 and each of the first and second beacon assemblies 101 and 102 represents a first subset of encoded light beams 290 and a second subset of encoded light beam 292, respectively, that can only be received by the receiver 250 at its current position. Each of the first and second subsets of encoded light beams 290 and 292 includes one or more encoded light beams of the first and second plurality of encoded light beams emitted through each apodizing slit 150 of the first and second beacon assemblies 101 and 102, respectively. The first and second subsets of encoded light beams 290 and 292 received by the receiver 250 are emitted from a first and second corresponding subsets of light sources of the plurality of light sources 120 within each of the first and second beacon assemblies 101 and 102, respectively.

In one embodiment, when the receiver 250 moves to a second position in relation to the first position, the receiver 250 would be able to receive and detect a third and fourth subsets of encoded light beams that are different from the first and second subsets of encoded light beams (and are not shown in FIG. 2 for clarity). The third and fourth subsets of encoded light beams are emitted from a third and fourth subset of light sources of the plurality of light sources 120 within each of the first and second beacon assemblies 101 and 102, respectively. In one embodiment, the first and second subsets of encoded light beams 290 and 292 are partially different than the third and fourth subsets of encoded light beams where the first and second positions of the receiver 250 are relatively close together.

In one embodiment, the optical location tracking system 200 can track the receiver 250 along a first dimension within the three-dimensional space by extracting a first angular direction information from one or more encoded light beams received from corresponding light sources within the first beacon assembly 101. The first angular direction corresponds to a first angular plane where the receiver 250 is located along the first dimension within the three-dimensional space. Similarly, the optical location tracking system 200 can track the receiver 250 along a second dimension within the three-dimensional space by extracting a second angular direction information from one or more encoded light beams received from corresponding light sources within the second beacon assembly 102. The second angular direction corresponds to a second angular plane where the receiver 250 is located along the second dimension within the three-dimensional space. In this example, the beacon assembly 101 is positioned perpendicular to the beacon assembly 102, as shown in FIG. 2. Thus, the angular planes formed by the emitted light beams from the first beacon assembly 101 and the second beacon assembly 102 are also perpendicular. Consequently, the optical location tracking system 200 is able to determine the location of the receiver 250 at the intersection of the first and second angular planes. Therefore, the movement of the receiver 250 can be tracked along a line formed at the intersection of the first and second angular planes within the three-dimensional space located in view of the beacon assembly 101 and beacon assembly 102. The coordinates of the receiver 250 along the line formed at the intersection of the first and second angular planes within the three-dimensional space may be determined along two of the three dimension, i.e. an x-y coordinates of the receiver location may be determined.

For example, the optical location tracking system 200 computes and determines a first position of the receiver 250, within the three-dimensional space located in view of the beacon assembly 101 and beacon assembly 102, using the first and second subsets of encoded light beams 290 and 292 from the beacon assembly 101 and beacon assembly 102. Similarly, using the third and fourth subsets of the encoded light beams, the optical location tracking system 200 can compute a second position of the receiver 250 within the three-dimensional space located in view of the beacon assembly 101 and beacon assembly 102. Therefore, the optical location tracking system 200 is able to track the movement of the receiver 250 from the first position to the second position.

In another embodiment, if the receiver 250 moves to a third position, then a fifth and sixth subsets of encoded light beams (not shown in FIG. 2 for clarity) would be received and detected by the receiver 250 from the beacon assembly 101 and beacon assembly 102. The fifth and sixth subsets of encoded light beams are different than the first, second, third, and fourth subsets of encoded light beams. Hence, the optical location tracking system 200 can detect and track the movement of the receiver 250 along two dimensions as described in the examples above: from the first position to the second position to the third position, within the three-dimensional space in view of the beacon assembly 101, and beacon assembly 102, using the first and second, the third and fourth, and the fifth and sixth subsets of encoded light beams that are received at the first, second and third positions, respectively.

In one embodiment, each of the plurality of light sources 120 is driven by a uniquely encoded electrical signal such that each of the emitted light beams is a uniquely encoded light beam corresponding to the uniquely encoded electrical signal. Each uniquely encoded electrical signal comprises a unique code that includes information used to identify the light source being driven, the beacon assembly, and the location of the light source on the cylindrical surface 111. For example, each uniquely encoded light beam emitted from the beacon assembly 101 include identification information of the light source and its specific angle $\theta_1$ 131 which corresponds to an angular plane of the encoded light beam as being viewed or received by the receiver 250 at its current location from the specific light source of the beacon assembly 101. Thus, each light source is driven by a uniquely encoded electrical signal that is different from any other encoded electrical signals used to drive the rest of the plurality of light sources 120 of the first beacon assembly 101 and any other encoded electrical signals used to drive any other light source of any beacon assembly that a system may contain. As described above, the apodizing slit 150 enables the encoded light beams emitted by the plurality of light sources 120 to emerge from the beacon assembly 101 or 102 to resemble angular planes of light whose orientation can be defined by its azimuthal angle $\theta$. In one embodiment, the angle $\theta$ defining this plane can be calculated in spherical coordinates or other three-dimensional coordinate systems.

In one embodiment as shown in FIG. 2, the receiver 250 receives the encoded light beams emitted from the first beacon assembly 101 (B1) having a vertically oriented apodizing slit 150 and from a second beacon 102 (B2)

oriented perpendicular to the first beacon having a horizontally oriented apodizing slit 150. Signal processing techniques are used to detect and decode information from the received encoded light beams. These various techniques can be implemented using hardware, software and/or firmware to enable the extraction and computation of the azimuthal angle θ of the receiver's 250 position in a first angular dimension and the polar angle φ in a second angular dimension. For calculating the radial distance R separating the receiver 250 from B1 or B2, a third beacon assembly 103 (B3), oriented preferably with a horizontal slit (a vertically oriented slit can be used as well) emits a plurality of encoded light beams in a similar way as described above for B1 and B2 and the receiver 250 receives an encoded subset of light beams 294 from B3, as shown in FIG. 2. Thus, if apodizing slit 150 of B3 is vertically oriented then the angular quantity θ$_3$ 133 (or if apodizing slit 150 of B3 is horizontally oriented then the angular quantity φ$_3$) can be computed and used along with the computed θ$_1$ 131 and the φ$_1$ 135 (which are computed based on one or more encoded light beams received from each of B1 and B2, respectively) to triangulate the receiver's 250 absolute position in three-dimensional space using spherical coordinate system, cartesian coordinate system X-Y-Z, or other coordinate systems.

In one embodiment, the optical location tracking system 200 of FIG. 2 includes three stationary beacons each of which emitting a plurality of encoded light beams into a three-dimensional space where a movable object can arbitrarily move within. The plurality of encoded light beams can be, for example, a plurality of encoded infrared light beams emitted from a plurality of infrared light sources within each of the three stationary beacons. Based on the location of the receiver 250 with respect to each of the three beacons, one or more of the encoded light beams from each of the three beacons are received by the receiver 250 and are processed by hardware, firmware and/or software that are included within the receiver 250. A typical arrangement is to have B1 and B2 positioned in a fixed location near each other and perpendicular to each other, as shown in FIG. 2. B3 can be situated a reasonable distance (e.g. 2 to 5 ft.) away from the pair B1 and B2. A spherical coordinate system is suggested, which places B1 at the origin and axes are defined parallel with the sides of the B1 mounting block. Since B1 and B2 are chosen to be positioned near each other, the angle φ determined by B2 also falls within the same coordinate system. For B3, a coordinate transformation will be required. As indicated in the drawing of FIG. 2, the receiver 250 receives encoded light beams 294 and the desired angle θ$_3$ is obtained by subtracting OT (transformation angle) from θ" (initial output angle). This arrangement allows for the calculation of a single point location of the moving object at the intersection of three angular planes, each angular plane is defined by its unique directional angle as computed by the receiver 250.

Figure 3:
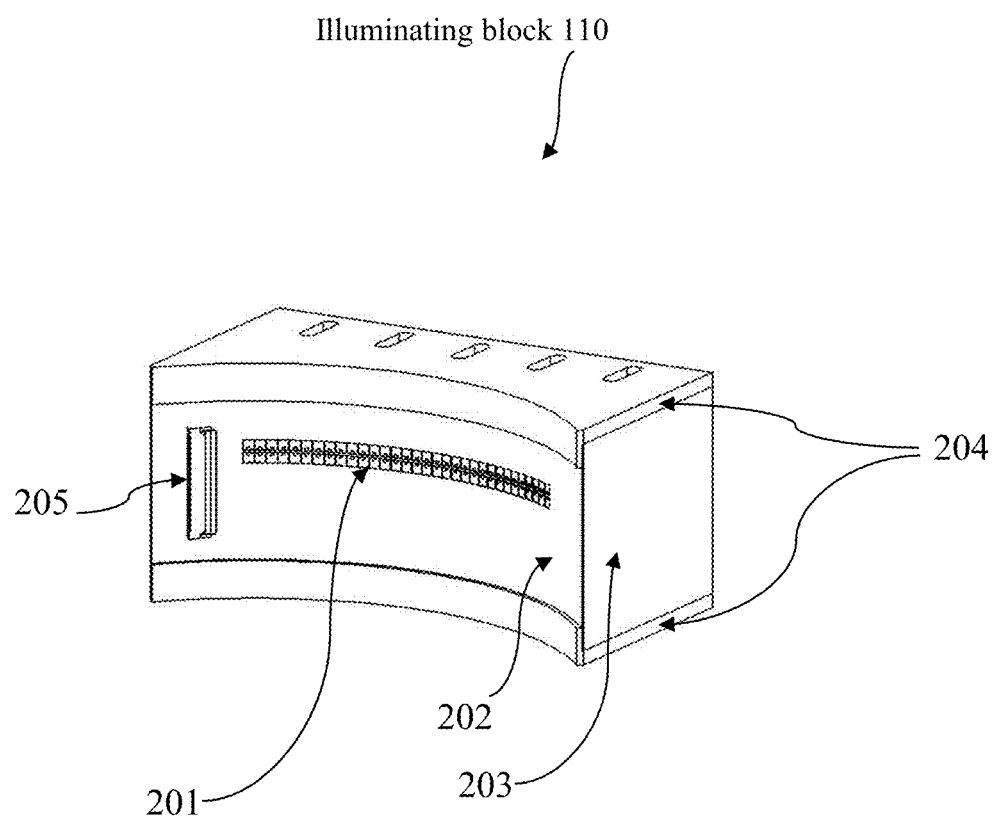
FIG. 3 illustrates an illuminating block.

The illuminating block 110, which comprises the core of a beacon, is shown in detail in FIG. 3. In one embodiment, thirty-two LEDs 201 are mounted on a thin or flexible PCB 202 at regular horizontal spacing. The PCB 202 is held in place on a concave cylindrical surface of a mounting block 203. The concave cylindrical surface radius is chosen to optimize a desired field of view of the beacon and a given coverage of a desired three-dimensional space. Moreover, the radius may vary based on the application e.g. desired location tracking accuracy. The PCB 202 is clamped to the mounting block 203 by means of clamping hardware 204 at top and bottom of the mounting block 203, which bends the PCB 202 and forms its shape to match that of the cylindrical surface. This setup effectively positions the LEDs 201 so that their focal point lies at the center of the cylindrical surface's arc, where the apodizing slit is placed. The LEDs 201 may be driven using, for example, a ribbon cable connected to the PCB via an electrical connector 205. As is clear to people skilled in the art, this is but one example of setting up and arranging the LEDs 201 and PCB 202 onto the mounting block 203, other beacon's configurations can be achieved using other means and methods.

Figure 4A:
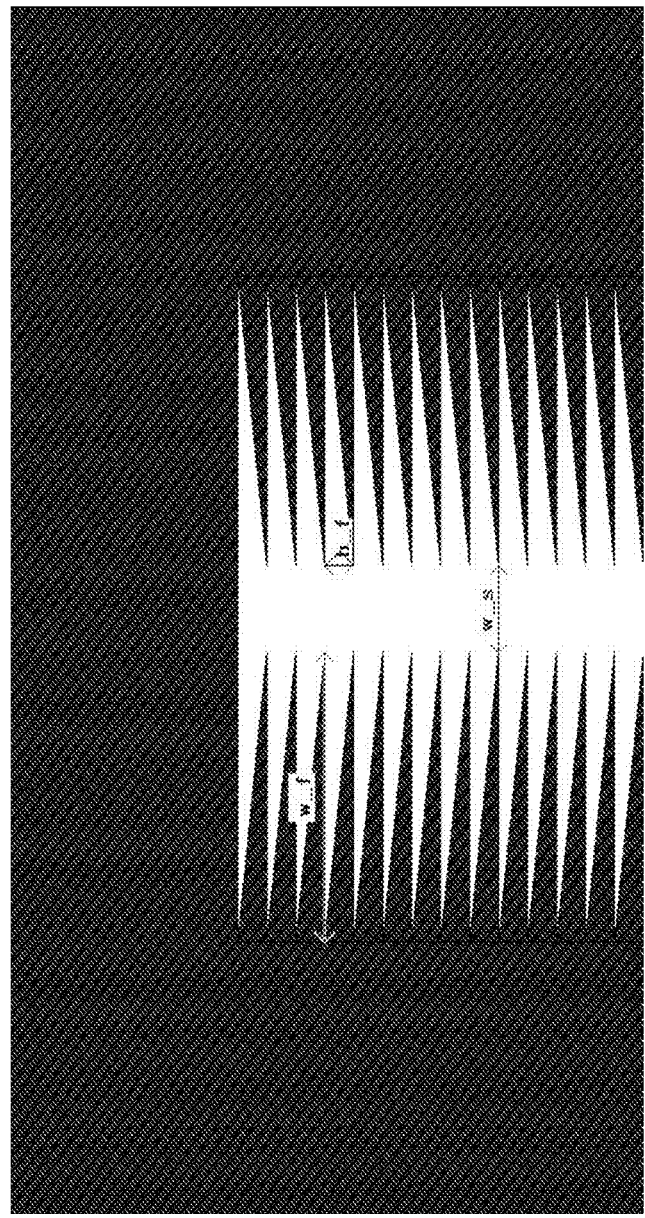
FIG. 4A illustrates an apodizing slit.
Figure 4B:
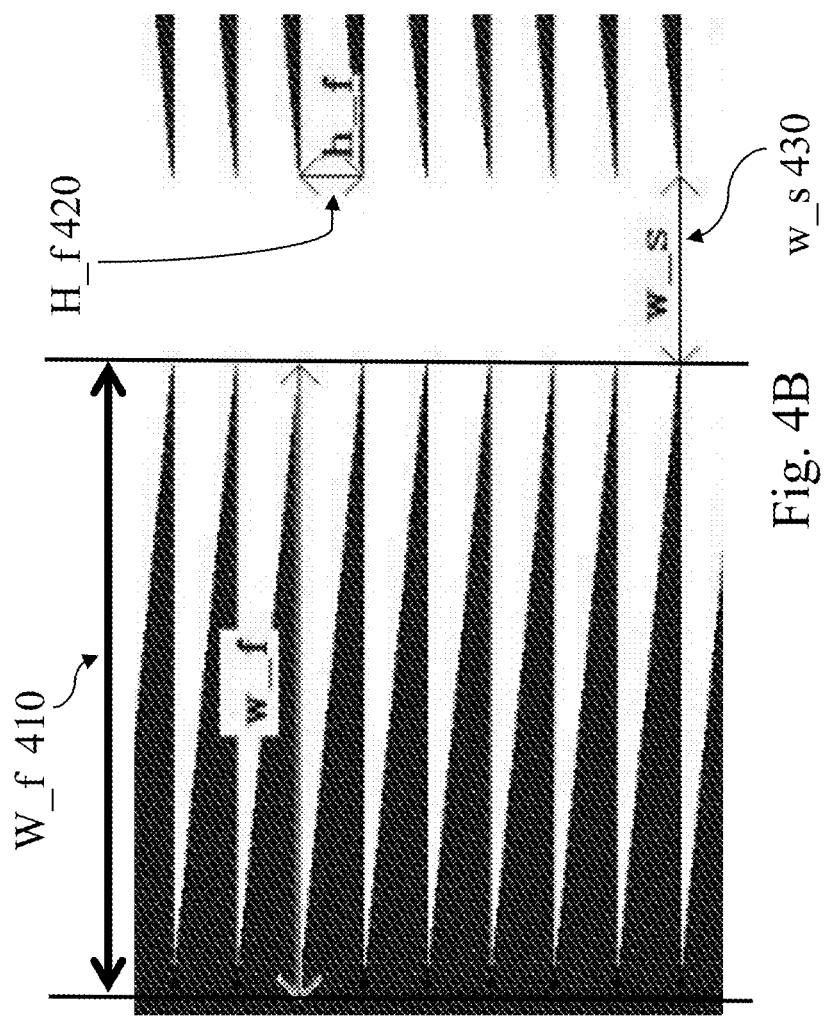
FIG. 4B illustrates a zoomed-in region of an apodizing slit.

In one embodiment, a vertically oriented apodizing slit 150, which serves to limit the horizontal field of view reaching the receiver 250, having apodizing features extending outward from the central slit as shown in FIG. 4A. The apodizing slit 150 may also be a simple vertical slit with straight edges. The apodizing slit 150 is positioned in front of a beacon assembly 100 as described above and the receiver 250 can be mounted on a moving object that moves within the field of view of the beacon assembly 100. The receiver 250 includes a photodetector (or other means to receive the encoded light beams) to convert the light received from the beacon assembly 100 into an electrical signal that can be digitally processed in the receiver 250. The purpose of the apodizing features is to attenuate the light gradually as one moves away from the central slit opening. The exact shape and dimensions of these apodizing features is chosen to optimize results based on application and deployment conditions, including the specific wavelength of light being used as shown in FIG. 4A. FIG. 4B illustrates a zoomed-in portion of the apodizing features of the apodizing slit 150. Here the central slit is shown having width w_s 430. A typical value for w_s 430 is about 1 to 1.5 mm. The apodizing features are here drawn in the shape of right triangles extending outward from the central slit. These right triangles are shown having width w_f 410, and height h_f 420. A typical value for w_f 410 is about 5 mm, while h_f 420 may lie in the range of 0.05 to 0.5 mm. The wide aspect ratio of these features allows for many of them to be stacked along the vertical height of the apodizing slit 150, resulting in considerable averaging of the emerging light intensity profiles. This averaging helps to make subsequent calculations by the receiver 250 smoother and reduce the effects of noise.

The apodizing slit 150 may be printed on a photo film or other suitable material and held in place mechanically within beacon assembly 100. The total height of the apodizing slit 150 may be 25 to 75 mm. The total width of the apodizing slit 150 is given by: w_s 430+2*w_f 410 and may be in the range of 5 to 20 mm. These dimensions may be varied depending on the specific application and space.

The light intensity profiles (of the plurality of encoded light beams) emerging from the apodizing slit 150 are detected and analyzed by the receiver 250. The choice of triangular apodizing features in the apodizing slit 150 results in triangular (ramping) light intensity profiles. This neat, ramping output facilitates the task of interpolating angle between two neighboring light sources or LEDs. Given a particular arrangement of a beacon assembly 100, and in most cases, the photodetector's angular plane may not lie directly in line with any plane of encoded light beam of one light source or LED. Rather, it will lie somewhere in between planes of encoded light beam identifying a pair of light sources, and interpolation will be needed to determine the object's azimuthal angle θ. When the photodetector does lie directly in line with a single light source, the angle θ is simply equal to the angular orientation of that one light source based on its location onto the concave cylindrical surface of the illuminating block 110. In one embodiment, a weighted calculation of the relative contributions of two or more encoded light beams received from corresponding two or more light sources is performed by the receiver 250 in order to ascertain the angle θ.

In one embodiment, a method by which the receiver 250 calculates angle θ is disclosed below. Keeping in mind that the use of uniquely encoded light beam emitted from each light source coupled of each beacon with specific signal processing techniques allow the receiver 250 to identify not only which beacon the received encoded light beam is coming from, but also which specific light source within that beacon has emitted the received encoded light beam, other information may be deduced as well.

In one embodiment, the driving electrical signal of each light source is encoded with a binary code, where each light source is assigned its own uniquely identifiable code. A variety of techniques may be useful to provide the uniquely identifiable code. For example, a preferred binary code is a Pseudo Noise (PN) or Pseudo Random Noise (PRN) code known as the maximal length sequence (M-sequence), whose correlation property makes it particularly useful for our application. This correlation property states that the autocorrelation of an M-sequence is a Kronecker delta function, in other words, the autocorrelation operation returns a pulse of a specific amplitude at one position in the sequence, while all other output positions return zeros. This is described in further details in the following paragraphs.

M-sequences have been widely used in the technology supporting wireless telecommunication, for example in CDMA (Code Division Multiple Access). The autocorrelation of a Pseudo Random Noise (PRN) code or Pseudo Noise (PN) code yields very low amplitudes at all bit positions except at one or a few positions where the correlation codes match up. These positions, called correlation peaks, display very high amplitude. The precise positioning of these correlation peaks is a unique identifier differentiating one particular PN code from others. This concept forms an underlying basis for CDMA, which allows many wireless users to share a common electromagnetic (EM) signal frequency for communication, while their particular lines of communication are uniquely differentiated by a PN code.

In one embodiment, a master M-sequence is selected and recorded in the receiver 250 system, which includes at least a memory subsystem and a processor. The beacon assembly 100 includes an electronic subsystem that generates and independently drives each light source with its own uniquely identifiable code using an electrical signal that is encoded with the uniquely identifiable code. Moreover, each of the light sources is driven with a signal encoded with the master M-sequence that is shifted by a specific time lag, corresponding to a particular number of pulse widths, which can be referred to as chip delays or time delays. In the context of binary sequencing, the word chip (the unit chip delay) refers to one bit of information occupying one position in a sequence, which requires a specific length of time to transfer. On a plot of data vs. time, a chip is often depicted as a pulse of fixed width equal to the unit chip delay. The amplitude of the pulse gives the stored value of its position in the sequence.

Figure 5:
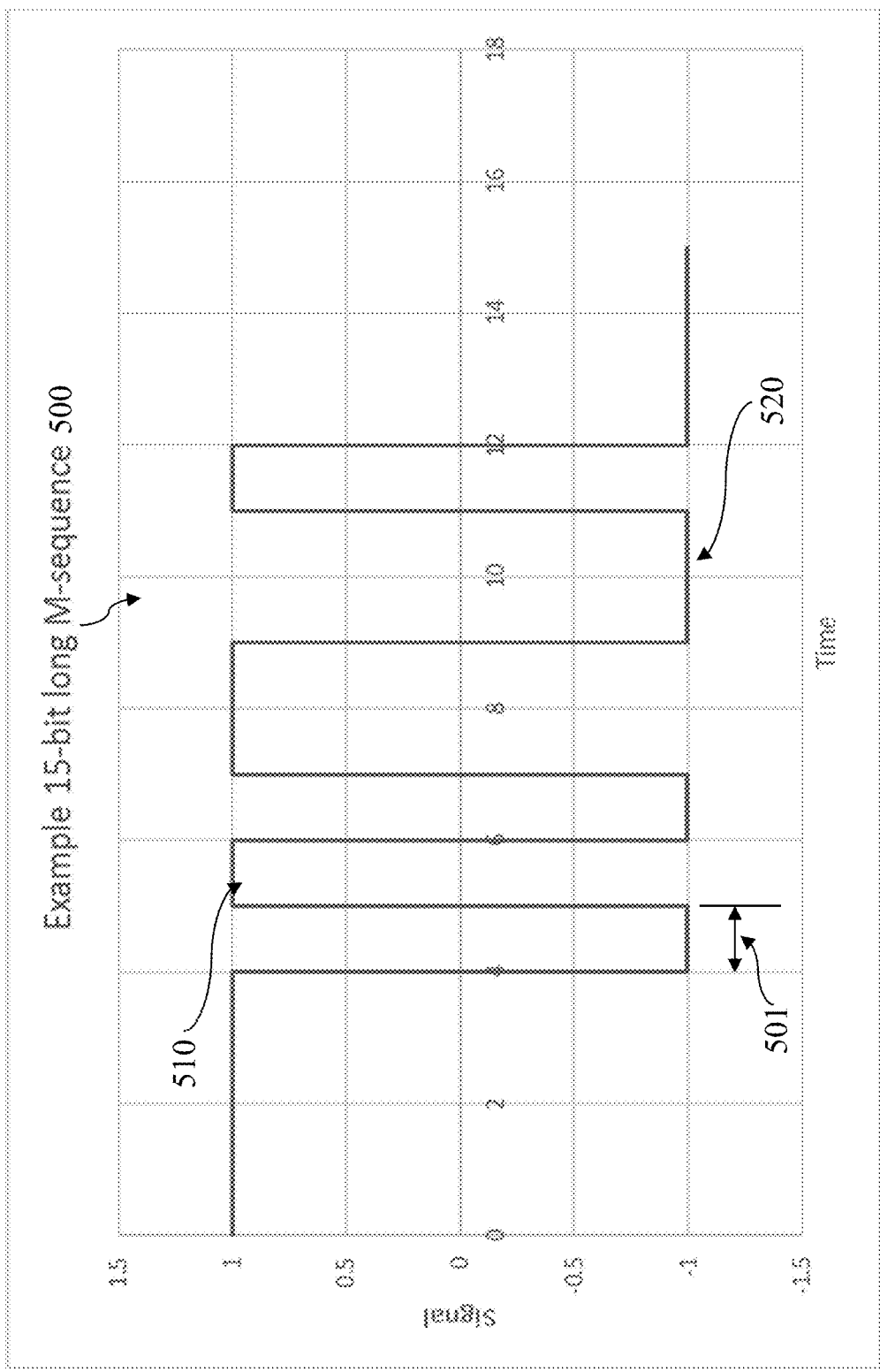
FIG. 5 illustrates an example of 15-bit long M-sequence.

An example 15-bit long M-sequence 500 illustrating a chip (a chip delay) 501, and a pulse as used in this disclosure is shown in FIG. 5. The 15-bit long M-sequence 500 is plotted in the form of a Data vs. Time graph. Pulse A 510 and pulse B 520 have widths of one chip delay and two chip delays, respectively. Here, Pulse B 520 represents two chips, adjacent to each other in time and having width equal to the unit chip delay, and amplitude equal to the value of that position in the sequence, in this case, −1. Pulse A 510 represents a single chip having value of 1.

In one embodiment, an original (unshifted) M-sequence is recorded in the memory of the receiver 250. The same original (unshifted) M-sequence is used within each beacon assembly 100 to generate the encoded electrical signal to drive each light source. The original (unshifted) M-sequence code is then time-shifted by a different number of chip delays and used to drive each light source. In this way, the number of chip delays used to time-shift the M-sequence code becomes the unique identifier for each light source. The receiver 250, upon processing the received encoded light beams, is able to identify which light source and which beacon if multiple beacons are used in a three-dimensional (3D) tracking system had emitted the encoded light beams received by the receiver 250.

In one embodiment, the receiver 250 performs an autocorrelation operation between the received (time-shifted) signal and the original (unshifted) code. The autocorrelation operation generates a pulse at the chip position where the emitted and received codes are matched, while all other chip positions would be nil or zero. This lone pulse is referred to as a correlation peak, and its amplitude is proportional to the intensity of the received encoded light beam from a particular light source, while the correlation peak's position in the sequence corresponds to the light source position within the beacon assembly 100.

In one embodiment, the light sources are numbered serially 1 through 32 with increasing numbers moving along the horizontal arc of the cylinder surface of beacon assembly 100. Each light source is driven by an electrical signal having a unique code. This unique code is recovered by the receiver 250 upon receiving and processing the encoded light beams, some interpolation or additional computation may be used as described above. The unique code is used to trace back to the physical location of the light source within the beacon assembly 100. Hence, determining the angular direction of the light beam (referred to above as angular plane) emanating from the apodizing slit 150 of beacon assembly 100.

Figure 6:
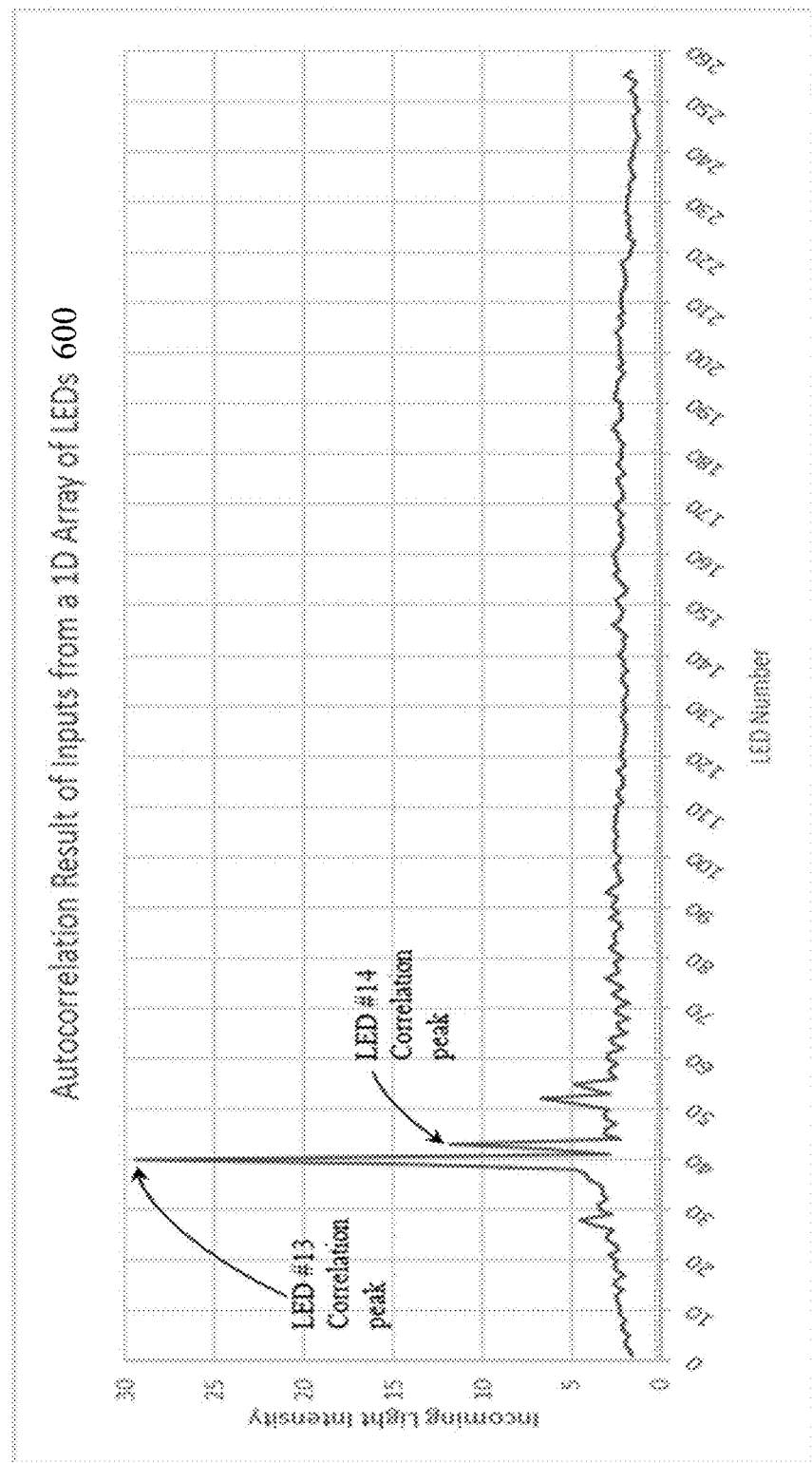
FIG. 6 illustrates a correlation plot of light beams received from a beacon.

In one embodiment, autocorrelation output from an M-sequence correlation of length 255 chips is illustrated in FIG. 6: Autocorrelation Result of inputs from a 1D Array of LEDs 600 plot. This output plot is a compiled plot of autocorrelations conducted for each of the code (specific delays) unique to each of the LEDs 201 in the beacon assembly 100. For example, for LED #1, the time-shifted M-sequence that was applied to LED #1 is autocorrelated with the original unshifted M-sequence; this is a first autocorrelation process. The result is a first correlation peak at Position 1 of the Autocorrelation Result of inputs from a 1D Array of LEDs 600 plot while all other positions have zero output. Hence, the ability to conclude that the light beam received here corresponds to light source LED #1. The amplitude of the first correlation peak represents the intensity of encoded light beam received from LED #1. This result is stored in memory for further processing. Similarly, a second autocorrelation process is conducted using the time-shifted M-sequence that was used to drive LED #2 and the original M-sequence. The resulting output is a correlation peak at position 2, hence deducing that the encoded light beam received here corresponds to LED #2. The amplitude of this peak is also stored in memory for further processing. This autocorrelation process is repeated for each code of all light sources, in this example 32 LEDs. Therefore, each encoded light beam received by the receiver 250 is autocorrelated to each of the 32-time shifted M-sequences resulting in a graph similar to the Autocorrelation Result of inputs from a 1D Array of LEDs 600 plot where a single or multiple correlation peaks indicates which one or more LED of the LEDs 201 is the source of the one or more received encoded light beams. The ability to identify the light source provides its physical location onto the concave cylindrical surface within the beacon assembly 100 and any other identification information associated with the light source. Because each individual autocorrelation output plot has only one peak at the position corresponding to the serial number of the light source or LED in the beacon, all of the meaningful information it contains can be extracted and combined with the autocorrelation output results from all of the 32 time-shifted M-sequences in the form of a compiled plot, as shown in FIG. 6, where two distinct correlation peaks are shown to be from LED #13 and LED #14 while all other correlation peaks have varying low amplitudes.

In one embodiment, the Autocorrelation Result of inputs from a 1D Array of LEDs 600 plot includes correlation peaks from a plurality of beacons. For example, the horizontal axis in FIG. 6 corresponds to the LEDs numbered 1 through 32, while in this example, not every individual position in the calculation plot is used; rather there are two blank positions between each position corresponding to an LED. Thus, in this example, positions 1 to 96 are used in the representation of the 32 LEDs from a first beacon assembly 100, while the remaining positions 97 to 256 are blank positions that can be used to store information from other beacon assemblies in the system. This disclosure allows for multiple beacons to be used in tandem.

In one embodiment, a receiver 250 is configured to receive and identify a plurality of light beams from a plurality of beacons, i.e., tens or hundreds of beacons. FIG. 6 is representative of how the correlation peaks information from additional beacons can be accumulated or represented and thus provide the ability to be manipulated within the same framework.

In one embodiment, synchronized timing operations between the receiver 250 and the beacon assemblies can be achieved through the use of a synchronization step performed during initialization of the system or during operation if needed. Examples of synchronization techniques between the receiver 250 and beacon assembly 100 can be achieved by the following methods, though not limited to these: a wire or a cable connecting the two devices, the use of a distinct optical signal emitted by the same or additional light sources comprising the beacons in this system, wirelessly by employing an RF transmission, or wirelessly by employing an optical transmission.

In other embodiments, when the beacon is placed in a known location with its back to a wall or similarly unimportant surface, then it is enough for the beacons to emit light outward in a 180° shell covering less than half of the surroundings. It is then assumed that all important tracking activities will happen within the field of view (FOV) of the beacon.

In another embodiment, for applications that demand a wider FOV, the beacons can be mounted at perpendicular angles to each other, so that the set of beacons working together can cover a wider range of space within their FOV. A set of 4 beacons placed at right angles to each other could be employed, allowing the combined set to cover an entire 360° FOV in azimuth, with sufficient overlap to ensure complete coverage.

In one embodiment, a set of three beacons and one receiver 250 mounted onto a moving object are sufficient for many simple applications, to calculate the absolute XYZ position of the moving object within a three-dimensional space within the FOV of the three beacons.

In one embodiment, the use of multiple beacons in a location tracking system and multiple receivers mounted onto a moving object may still be desirable, simply because it introduces redundancies into the location tracking system. These redundancies help compensate for limitations involved in the practical range and usage of the system, such as a particular light path being blocked by an intervening object. Such limitations are likely to occur from time to time in the course of tracking any real-world moving object. In order to further improve performance and address environment or design limitations, a two-dimensional array of radiating sources mounted into a single beacon assembly will be disclosed in detail below.

Figure 7A:
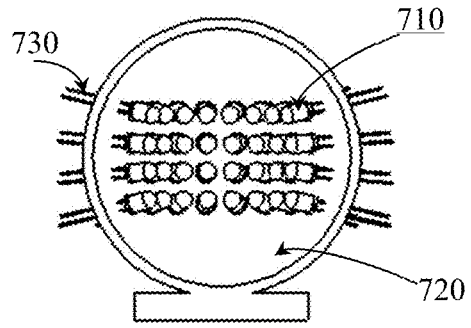
FIG. 7A illustrates a frontal view of a beacon that includes multiple arrays of radiating sources.
Figure 7B:
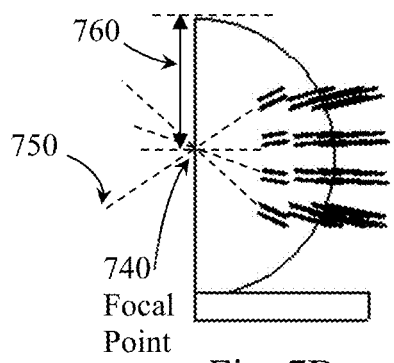
FIG. 7B illustrates a side view of a beacon that includes multiple arrays of radiating sources.
Figure 7C:
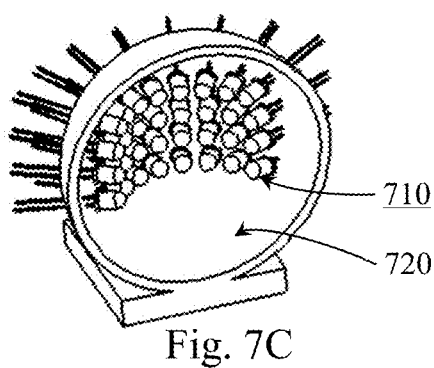
FIG. 7C illustrates a perspective view of a beacon that includes multiple arrays of radiating sources.

An example embodiment of a two-dimensional (2D) beacon 700 comprising a 2-dimensional array of Light Emitting Diodes (LEDs) 710, i.e. electromagnetic radiation sources, mounted on a hemispherical dome surface 720 is illustrated in a frontal view in FIG. 7A, a side view in FIG. 7B, and a perspective view in FIG. 7C. The hemispherical dome surface 720 can be seen with its 32 LEDs 710 in FIGS. 7A and 7B. The side view includes a conceptual depiction of light rays (beams) 750 emanating from the LEDs 710, converging at a focal point 740 at the center of the hemispherical surface 720 having a radius Rb 760, and then radiating out the opposite side of the focal point. In one embodiment, a beacon consists of 32 LEDs 710 mounted on a thin hemispherical shell or printed circuit board that is attached to the hemispherical dome surface 720.

In one embodiment, the LEDs 710 are mounted onto or through the hemispherical dome surface 720, with electrical leads 730 extending out of the hemispherical dome surface 720 where electrical connectivity is performed. In one embodiment, the hemispherical dome surface 720 is formed like a shell and may be made of hard plastic, flexible materials, or some type of metallic or semi-metallic material having through-holes to allow for electrical leads or other type of electrical communication may be used to communicate and drive uniquely encoded electrical signals to each one of the LEDs 710. Moreover, the electrical connection to the LEDs 710 may be made using a ribbon cable or other types of electrically conductive material suitable for connecting to the electrical leads of each LED and possibly molded within the shell or the hemispherical dome surface 720. An alternate embodiment would be to mount the LEDs 710 on a flexible PCB with appropriate cut outs so that it can be formed into a hemispherical dome shape and be fitted into a hemispherical shape like the hemispherical dome surface 720. Moreover, the shell like material or the hemispherical dome surface 720 can be enclosed within an apparatus forming the 2D beacon 700.

In one embodiment, the radius Rb 760 can be chosen to optimize the desired field of view (FOV) of the beacon, i.e. a desired coverage of a defined three-dimensional space in the FOV of the 2D beacon 700. which may vary based on the particular application. In this embodiment, 32 LEDs are arranged in an 8×4 array, and the spacing between each of the LEDs and related dimensions are chosen to offer a FOV extending over 90 degrees horizontally and almost 45 degrees vertically, which is illustrated by graphics showing layout and directivity of LEDs 710 tracking the shape of the hemispherical dome surface 720 as shown in FIG. 7A and FIG. 7C.

In one embodiment, a typical configuration of a beacon consists of a plurality of radiating beam sources, for example light emitting diodes or LEDs 710, and a hemispherical dome surface 720 having a radius Rb 760. The LEDs 710 are mounted onto the hemispherical surface of the beacon and each of the LEDs 710 emits light rays 750 (preferably infrared light rays or beams) that is encoded with a unique binary code associated with only one LED, as described in earlier paragraphs, and thus a receiver that is within the FOV of the 2D beacon 700 (not shown in FIG. 7) is able to identify each light beam 750 that it receives. As discussed above, each light beam of the light beams 750 is emitted continuously from a specific LED with its unique code; however, given a location and/or a certain direction of the receiver not all light beams 750 are received with equal intensity. For example, for a given location and direction of the receiver, one or more of the light beams 750 may be received with high intensity while some of light beams 750 may be received with relatively lower intensity and while others are not received at all. The encoded light beams that are received are converted to electrical signals, for example by using a photodiode and a transimpedance amplifier, which are then processed using a variety of signal processing techniques for extracting the coded information associated with each received light beam. This extracted coded information is saved and further processed to identify which of the LEDs 710 in the 2D beacon 700 have emitted the received light beams and to infer the location of the receiver, in other words to infer the angular direction—azimuth θ and polar angle φ—of the receiver's location relative to the 2D beacon 700, wherein knowing the location the 2D beacon 700 within a three-dimensional space would permit knowledge about the location of the receiver with the three-dimensional space.

In a preferred embodiment, the absolute position of the receiver within the three-dimensional space is obtained by triangulation techniques using the extracted and processed information of light beams received from two or more 2D beacons. In one embodiment, the use of a plurality of 2D beacons within the same operational space would permit improved coverage and accuracy, and/or it can provide added redundancy in the design of a location tracking system over a large space.

In yet another embodiment, one or more receivers are mounted onto a moving object to be tracked. This approach is particularly advantageous in applications where the object's angular orientation needs to be tracked, along with its position within a three dimensional space. Moreover, this approach can be expanded further by making use of three or more receivers mounted on an outward face of a freely movable object in order to fully extract and define the object's six degrees of freedom within the three-dimensional space, as will be described in further details below.

In yet another embodiment, a single 2D beacon 700 can be mounted onto a ceiling or an elevated surface of an environment and the beacon's open hemispherical surface is pointing downwards and thus permit location tracking, in two dimensions (X-Y directions), of one or more receivers mounted onto users or objects moving freely on the floor, while assuming the receiver is at a certain fixed height in the Z direction above the floor.

The type of electromagnetic radiation sources chosen for use in the 2D beacon 700 may vary widely based on the desired application space. For example, many common commercial applications use LED in the visible or invisible spectrum of light. Moreover, considering the hemispherical beacon design, as illustrated in FIGS. 7A, 7B, and 7C, an almost collimated light (beam) is desired and a directional LED with appropriate angular spread can be used for our application. A collimated beam of light, or other electromagnetic radiation, has parallel rays and therefore will spread minimally as it propagates i.e. propagates with minimal or no divergence.

In one preferred embodiment, LEDs with a plastic lens body to collect the light, in leaded or surface mount configuration are used. The use of an infrared wavelength LED is considered for our application and building our 2D beacon prototype for cost and in order to help minimize interference from ambient light sources and to be invisible to the human eye and standard cameras. In one embodiment, each of the LEDs 710 includes an apodizing slit or other type of structure arrangement so as to emit a beam of collimated light.

Figure 8:
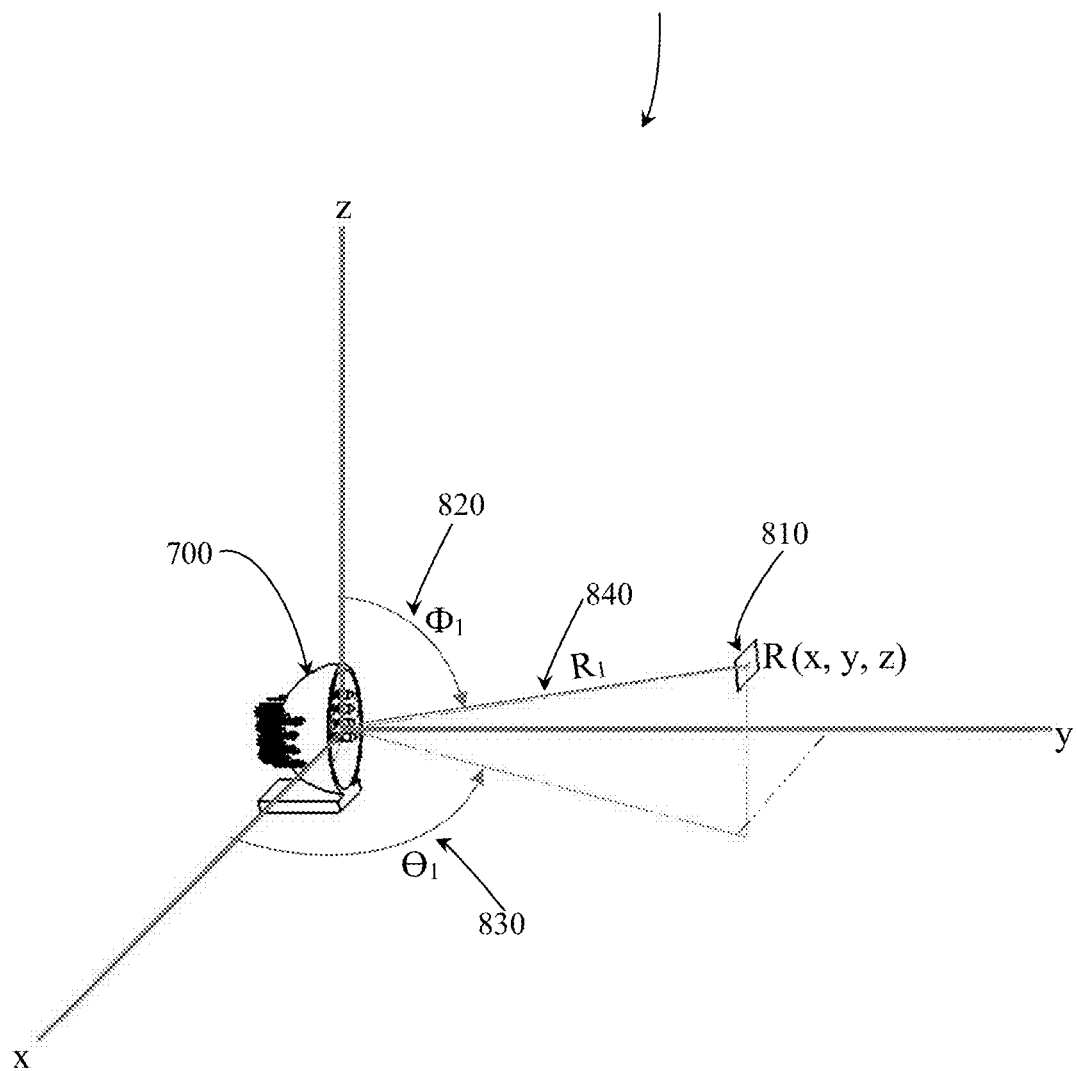
FIG. 8 illustrates a two-dimensional location tracking arrangement of a 2D-beacon and a receiver mounted onto an object.

In one embodiment, a two-dimensional location tracking arrangement 800 is illustrated in FIG. 8. A 2D beacon 700 and a receiver 810 mounted onto a freely movable object (shown simply as a square labeled 810 for illustration purposes) are placed within a framework of a spherical coordinate system as shown in FIG. 8. The azimuth $\theta_1$ 830 and polar angle $\varphi_1$ 820 angles and a radial distance $R_1$ 840 are labeled over a cartesian coordinate system x, y, z. The relevant projections of the receiver 810 location on the axis planes are indicated for illustration purposes as shown FIG. 8. The 2D beacon 700 is placed at the origin of the cartesian coordinate framework, while the receiver 810 is positioned at an arbitrary location within the framework. The quantities that defines the receiver 810 position in spherical coordinates system are: azimuth angle $\theta_1$ 830 and polar angle $\varphi_1$ 820, and the radial distance $R_1$ 840 that is represented in cartesian coordinate system as $R_1(x, y, z)$ corresponding to the projections of $R_1$ 840 onto the x, y, and z axes. This simple arrangement forms the foundation upon which the location of the receiver 810 is calculated with respect to the location of the 2D beacon 700. This approach of arranging the cartesian coordinate axis at the focal point 740 of the 2D beacon 700 and using the spherical coordinate quantities permit ease of calculation of the receiver 810 in two-dimensions, as was previously discussed above in the case using two one-dimensional beacon assemblies 100. Furthermore, an alternate arrangement includes a pair of 2D beacons 700 that can be used in tandem to triangulate and determine the absolute position of the receiver 810 in three-dimensions, as will be further described below, also similar to previous discussion of FIG. 2 above where three one-dimensional beacon assemblies 100 are used to triangulate and determine the absolute position of an object in three-dimensions.

Figure 9:
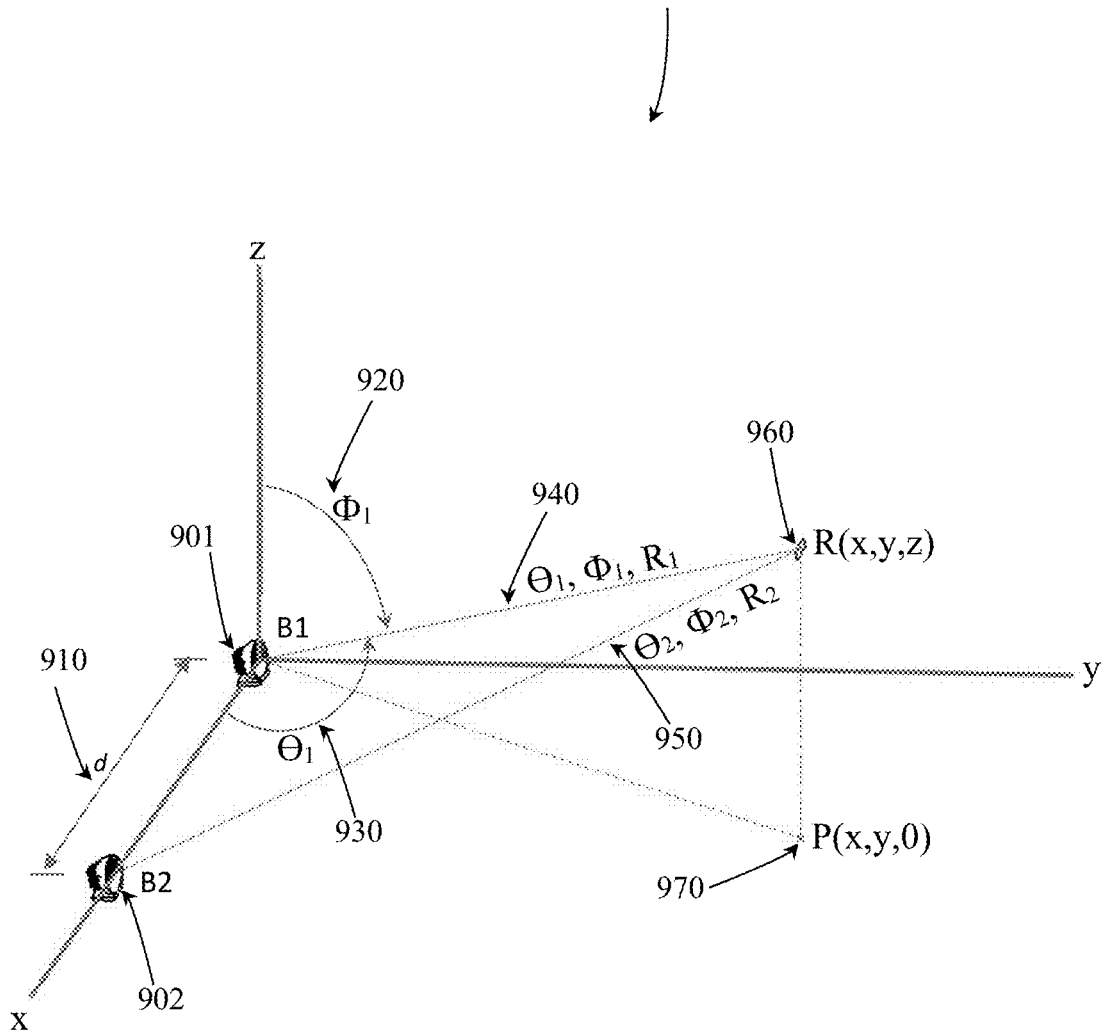
FIG. 9 illustrates a three-dimensional location tracking arrangement of two 2D beacons and a receiver mounted onto an object.

A three-dimensional location tracking arrangement 900 is illustrated in FIG. 9. In one embodiment, a first 2D beacon B1 901 being at a point located at (0, 0, 0) in a cartesian coordinate system (x, y, z), while a second 2D beacon B2 902 is located a certain distance d 910 in the x-direction at a point located at (d, 0, 0), as shown in FIG. 9, which for this example is approximately two to five feet. A freely movable object within a three-dimensional operating space is located in the field of view of both the first 2D beacon B1 901 and the second 2D beacon B2 902. A receiver 960 is mounted onto the freely movable object and is positioned at a point R(x, y, z). The projection of the point R(x, y, z) onto the XY plane is the point P(x, y, 0) 970, as illustrated FIG. 9, which represents a useful conceptual tool for understanding the relationship between spherical and Cartesian coordinates systems.

The receiver 960 is able to receive a first light beam 940, which can be defined by a first line having an azimuth angle, polar angle, and radial distance (θ1, Φ1, R1), from the first 2D beacon B1 901. The receiver is able to receive a second light beam 950, which can be defined by a second line having an azimuth angle, polar angle, and radial distance (θ2, Φ2, R2), from the second 2D beacon B2 902. The first light beam 940 and the second light beam 950 are collected at the receiver and are processed to extract coded information associated with the first 2D beacon B1 901 and the second 2D beacon B2 902. The extracted coded information from the first beam 940 is further processed to compute these angular quantities θ1, Φ1, and the extracted coded information from the second beam 950 is further processed to compute these angular quantities θ2, Φ2. Therefore, computing the location of the receiver 960 can be determined by knowing (i) the predetermined fixed positions of the first 2D beacon B1 901 and the second 2D beacon B2 902, and (ii) the computed angular quantities θ1, Φ1, and θ2, Φ2 of the two lines (940 and 950) extending between the receiver 960 and the first 2D beacon B1 901 and the second 2D beacon B2 902. The radial distances R1 and R2, as illustrated in FIG. 9, are not independently determinable quantities; rather, they are deduced from the combination of angular quantities θ1, Φ1, and θ2, Φ2 which are calculated by the receiver 960. The intersection of these two lines (940 and 950) yields the absolute position of the receiver 960 within the three-dimensional operating space. Example computations will be discussed in further details below.

In one embodiment, the value of the distance d 910 is typically chosen to be in the range of 2 to 5 feet based on a tradeoff between accuracy and coverage within the three-dimensional operational space. For the purpose of triangulation computation, a larger value of distance d 910 offers a higher accuracy in the result of the triangulation. At the same time, the limitation on the angular FOV of each of the first 2D beacon B1 901 and the second 2D beacon B2 902 causes a blind spot that is approximately d 12 in size in the area between the beacons, thus making it undesirable to choose a large value of distance d 910. Therefore, a different distance d 910 between the two beacons may be optimized for each application. Moreover, three or more 2D beacons may be used in order to avoid blind spots and to provide support for larger three-dimensional operational space. Sample processing and computational are provided and discussed in further details below.

In one embodiment, we consider a three-dimensional operational space such as a closed room with two 2D beacons located at one side of the room at a nominal user height y in the y-direction. Using the illustration of FIG. 9, we will make use of the same labels to disclose a sample computational system of equations for determining the location of a movable object within the three-dimensional operational space. As discussed above, the first 2D beacon B1 901 and the second 2D beacon B2 902 are separated by a distance d 910 in the x-direction, and a receiver 960 is located somewhere within the space of the room at R(x, y, z). we can define a spherical coordinate system whose origin is located exactly at the center of the first 2D beacon B1 901—at the geometric center of the spherical surface of the first 2D beacon B1 901—with cartesian coordinates x, y, and z axes extending in directions parallel with the walls and floor of the room. The first 2D beacon B1 901 is located at point B1(0, 0, 0), and the second 2D beacon B2 902 is located on the x axis at point B2(d, 0, 0).

Similar to our discussion in previous paragraph above, the receiver 960 determines angular quantities θ1, Φ1, and θ2, Φ2 by making use of and based on the uniquely encoded information in each light beam emitted from each LED within the first 2D beacon B1 901 and the second 2D beacon B2 902. The receiver 960 processes and extract the encoded information from each light beam collected at its current position. The extracted and processed information allows the receiver to identify not only which 2D beacon the received light beam is coming from but also which specific LED within that 2D beacon has transmitted the received light beam, thus knowing the azimuth θ and polar angle Φ for each light beam received and determining these angular quantities for the line extending from the receiver 960 to the center of the 2D beacon emitting the light beams received by the receiver 960. It is this specificity of the uniquely encoded information transmitted along with each light beam from each LED that allows for the calculation of the angles θ and φ as will be described in further details.

A computational system using at least a compute engine (such as a processor, and a memory system) may be used to solve a set of equations as presented below where angular quantities θ1, Φ1, and θ2, Φ2, are considered, for now, known quantities that already has been calculated by the receiver 960 as will be described below. As discussed above, angular quantities θ1 and Φ1 are azimuth and polar angles of a first line extending from the first 2D beacon B1 901 to the receiver 960 at the point R(x, y, z), and angular quantities θ2 and Φ2 are azimuth and polar angles of a second line from the second 2D beacon B2 902 to the receiver 960 at R(x, y, z). If $R_1$ and $R_2$ represent the length of the vectors running from each of the first 2D beacon B1 901 and the second 2D beacon B2 902 to the receiver 960, respectively, then the location of the receiver 960 within the room (the three-dimensional operational space) can be calculated using the following formulae for computing the x, y, and z coordinates of the point R(x, y, z).

$$x_R = R_1 \cos\theta_1 \sin\varphi_1 = d + R_2 \cos\theta_2 \sin\varphi_2 \quad \text{Eq. 1}$$

$$y_R = R_1 \sin\theta_1 \sin\varphi_1 = R_2 \sin\theta_2 \sin\varphi_2 \quad \text{Eq. 2}$$

$$z_R = R_1 \cos\varphi_1 = R_2 \cos\varphi_2 \quad Eq.3$$

Solving for $R_2$ yields:

$$R_2 = \frac{d\sin\theta_1}{\sin\phi_2 \sin(\theta_2 - \theta_1)} \quad \text{Eq. 4}$$

Plugging this value back into the equations above gives our desired result:

$$x_R = d\left\{1 + \frac{\sin\theta_1 \cos\theta_2}{\sin(\theta_2 - \theta_1)}\right\} \quad \text{Eq. 5}$$

$$y_R = \frac{d\sin\theta_1 \sin\theta_2}{\sin(\theta_2 - \theta_1)} \quad \text{Eq. 6}$$

$$z_R = \frac{d\sin\theta_1 \cos\phi_2}{\sin\phi_2 \sin(\theta_2 - \theta_1)} \quad \text{Eq. 7}$$

The use of the uniquely encoded signal to drive each of the LEDs in the first 2D beacon B1 901 and the second 2D beacon B2 902 is similar to our disclosure and discussion of FIGS. 5 and 6 above. The original (unshifted) M-sequence is recorded in the memory of the receiver, while the same code is time-shifted by a different number of chip delays and used to drive each LED. In this way, the number of chip delays used becomes the unique identifier that allows the receiver, upon processing the received light beam, to identify which LED and which beacon (if multiple beacons are used in a 3D tracking system) had transmitted the incoming light received at the receiver. The receiver processes the incoming light beams and perform autocorrelation operations between the received (time-shifted) signals and the original (unshifted) codes. The autocorrelation operations generate a pulse at the chip position where the transmit and received codes are matched, while at all other chip positions the amplitude would be nil or zero. This lone pulse is referred to as a correlation peak, and its amplitude is proportional to the intensity of the received light from a particular LED where its position in the sequence is associated with the LED's position within the beacon, and hence extracting angular quantities (azimuth θ1 and polar φ1 angles) from the first 2D beacon B1 901 corresponding to two-dimensional space location of the receiver within the three-dimensional operational space. Again, the location of the receiver in the third dimension is deduced by the receiver from the information that the receiver extracts and processes from light beams received from the second 2D beacon B2 902. The receiver extracts angular quantities (azimuth θ2 and polar φ2 angles) and performs computational steps as described above in equations 1-6 to determine the x, y, and z coordinates of the point R(x, y, z) of the receiver 960. An architype arrangement of electromagnetic radiation sources within a 2D beam will be discussed in further detail below.

Figure 10A:
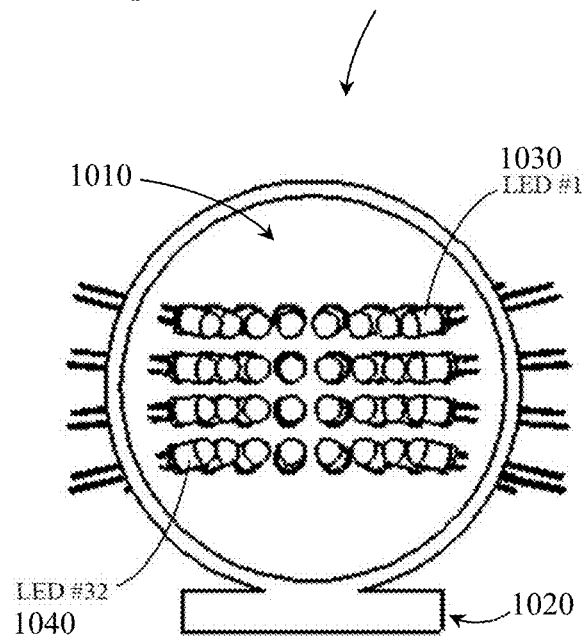
FIG. 10A illustrates a frontal view of a beacon that includes multiple arrays of radiating sources.
Figure 10B:
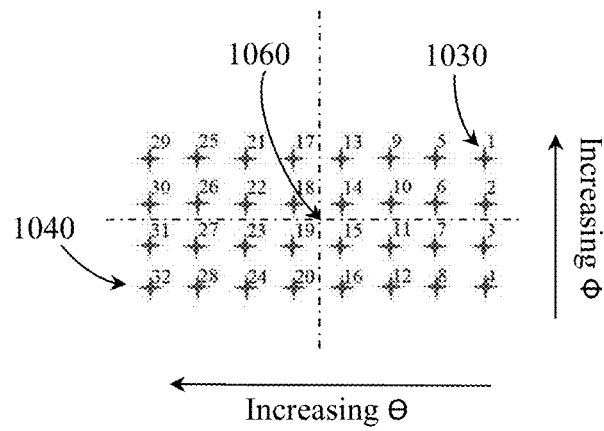
FIG. 10B illustrates an architype arrangement of LEDs that includes multiple arrays of radiating sources (LEDs).

A frontal perspective view of a 2D beacon 1000 is illustrated in FIG. 10A. The architype arrangement of LEDs 1050 is illustrated on FIG. 10B. The numbering of each LED depends on its physical location in a two-dimensional array including multiple rows and columns, in this example four rows and eight columns. Other architype arrangement of light beams sources are also intended for use in a 2D beacon, such as a hexagon form or other forms, which will be understood by persons skilled in the art how such arrangement would be associated with location of each LED source so as to enable a receiver to compute and deduce angular quantities and vector location of the receiver from the received light beams. As discussed above, each LED is driven by a signal with a unique code. This unique code is recovered by the receiver (upon receiving and processing the encoded beams to recover the unique code) and the unique code is used to trace back to the physical location of the LED within the beacon which is associated with specific angular quantities, and thus enabling the receiver to deduce the angular directions of the received encoded beams, hence, the angular directions of the receiver. FIG. 10B also depicts a 2D plot of the LED array in which the horizontal and vertical axes represent gradually increasing values of (direction lines) angular quantities angles θ and φ. The hemispherical surface 1010 of the 2D beacon 1000 is depicted, as illustrated in FIG. 10A, with four rows and eight columns of LEDs and each LED is numbered for identification, and each LED is associated with angular quantities that are unique to its location within the hemispherical surface. A base for the 2D beacon is illustrated at the bottom of the 2D beacon 1000. The first source LED #1 1030 is shown at far right of the top row, and last source LED #32 1040 is shown at far left of the bottom row. In this example, an increasing azimuth angle (0° to 180°) is depicted from far right column that include LED #1 1030 to far left column that include LED #32 1040, while having an increase in polar angle (0° to 180°) from bottom row to top row, and the geometric center 1060 is considered where θ=90° and Φ=90°, as illustrated in FIG. 10B. This architype arrangement is used to associate a light intensity profile, as sensed at the receiver, with an LED and to determine the directional line—angular quantities—between the 2D beacon and the receiver, as discussed above.

Figure 11:
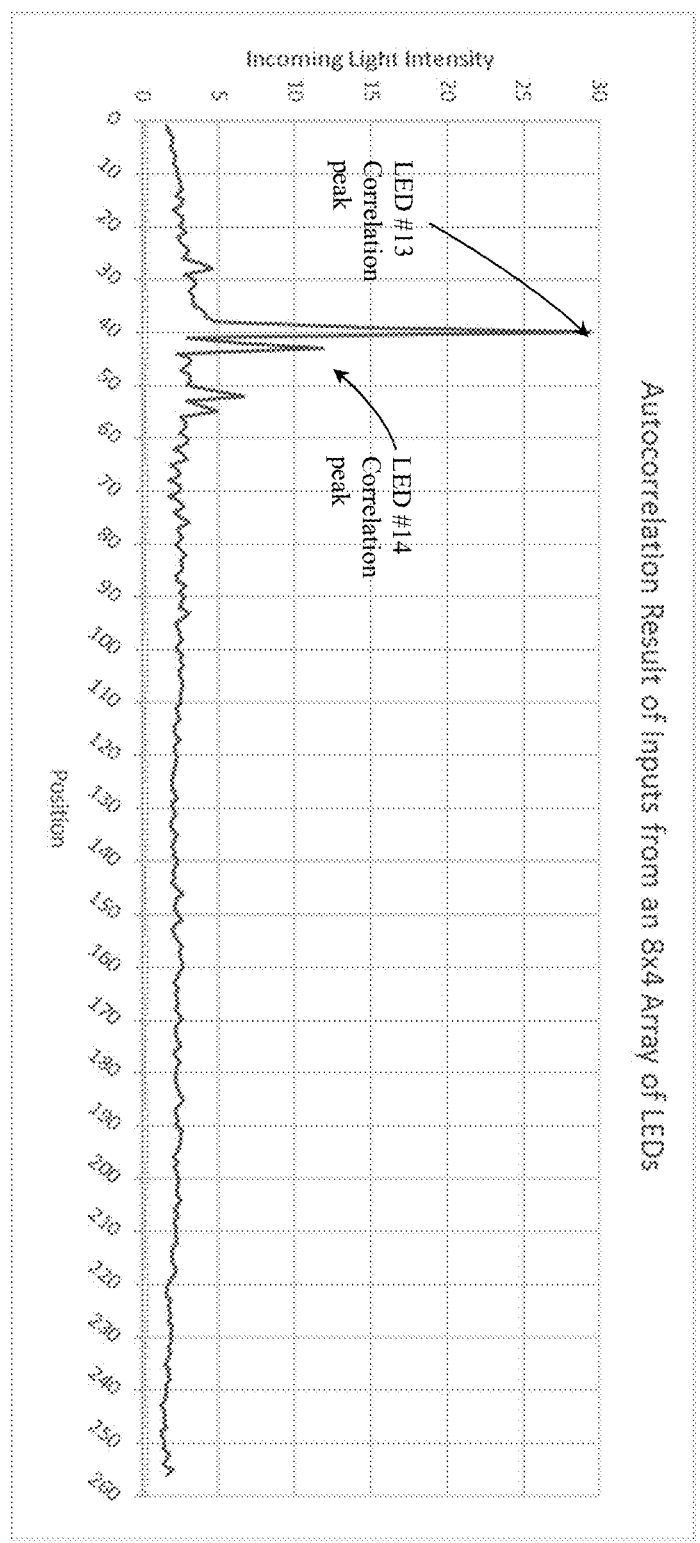
FIG. 11 illustrates a correlation plot of light beams received from a beacon having multiple arrays of LEDs, an 8×4 array.

An example output plot corresponding to autocorrelation output from an M-sequence correlation of length 255 chips is shown in FIG. 11. While the horizontal axis in FIG. 11 corresponds to the LEDs numbered 1 through 32 in FIG. 10, in this example, not every individual position in the calculation is used; rather there are two blank positions between each position corresponding to an LED. Therefore, in this example, positions 1-96 are used in the representation of the 32 LEDs as shown in FIG. 10 while the remaining positions 97-256 are blank positions can be used to store information from other additional beacons in a location tracking system. For example, we select position 3 to correspond to LED #1, thus LED #13 is at position 39, and LED #14 is at position 42. This output plot is a compiled plot of autocorrelations conducted for each of the specific delays unique to each of the LEDs in the beacon, in a similar fashion as discussed above for FIG. 6. For example, the time-shifted M-sequence that was applied to light emitted by LED #13 is autocorrelated with the original unshifted M-sequence. The result is a correlation peak at Position 39, thus the ability to conclude that the light beam received corresponds to LED #13, while all other positions have nil or zero output. The amplitude of the peak represents the intensity of the light received from LED #13. This result is stored in memory for further processing. Similarly, the autocorrelation is conducted using the time-shifted M-sequence that was used to drive LED #14 and the original M-sequence. The resulting output is a peak at position 42, hence the light beam received corresponds to LED #14. The amplitude of this peak is also stored in memory for further processing. This autocorrelation process is repeated for all 32 LEDs. Therefore, each light beam received by the receiver is autocorrelated to each of the 32 time shifted M-sequences resulting in a single peak associated with one light beam source LED within the 2D beacon. Because each individual autocorrelation output plot has only one peak at the position corresponding to the number of the source LED in the beacon, all of the meaningful information it contains can be extracted and combined with the autocorrelation output results from all of the other 32 time-shifted M-sequences in the form of a compiled plot as shown in FIG. 11, or stored in digital format for later processing, where two distinct peaks are at position 39 and 42 and thus are associated with LED #13 and LED #14, respectively.

As noted above, the unused positions in the autocorrelation output plot allows for multiple 2D beacons to be used in tandem. FIG. 11 illustrates how the information from additional beacons can be accumulated or represented, which then can be manipulated within the same three-dimensional location tracking system. In fact, a single receiver may be configured to receive and identify light from a plurality of beacons. Moreover, tens or hundreds of beacons may be used within a single three-dimensional location tracking system, and thus in such systems a receiver is configured to receive and process light beams and having ability to identify such light beams are received from specific 2D beacons from amongst tens or hundreds of beacons.

Bear in mind that this is simply one example of how the three-dimensional location tracking system can be arranged, designed and labeled. The method by which the predetermined angular quantities for each LED, i.e. how an LED is positioned and numbered within the 2D beacon, and how these angular quantities are associated with (or uniquely encoded with) the light beam being emitted from it may vary and depend on the application for such three-dimensional location tracking system. Furthermore, the unique code assigned to each LED may also vary and may depend on the architype arrangement, the application, and/or system design criteria. Furthermore, the number of LEDs employed within the beacon can be different and can vary to allow for tradeoffs between cost and accuracy.

The discussion above of FIGS. 1 through 11 are examples intended to illustrate the concept of three-dimensional location tracking of a freely movable object within a three-dimensional operational space. However, it should be noted that certain requirement for synchronized timing operations between the receiver and the transmitter may be utilized and performed during initialization of the system, during operation, or based on a user input, or based on system's needs. Examples of synchronization operations between the receiver and transmitter can be achieved using:

(i) a wire or cable connecting the two devices,
(ii) the use of a distinct optical signal emitted by the same or additional light sources comprising the beacons in this system,
(iii) wirelessly, employing an RF transmission, or
(iv) wirelessly, employing an optical transmission.

Additional synchronization operations or may be used and is not limited to the above listed types.

While we have discussed and disclosed above how a receiver can extract angular quantities (also may be referred to as directional angles θ and φ) using an incoming light beam from a beacon, the next step is to enable a receiver to extract these angular quantities from a plurality of incoming light beams from a single beacon. For example, a receiver located at a location within a three-dimensional operational space may receive multiple adjacent light beams emitted from multiple adjacent light sources within a single beacon, this may be the case where the receiver does not lie directly in line of sight with a single light source. Consequently, the receiver would receive multiple adjacent light beams, each of which having certain light intensity, and thus the receiver is configured to process, extract and create an intensity profile of the received light beams from the beacon. The receiver in turn calculates the directional angles θ and φ from the light intensity profile using a process of linear interpolation for inferring the receiver's angular position from the intensity profile.

For example, linear interpolation between two dominant intensity peaks associated with a pair of dominant LEDs can be used to gauge relative distance of the receiver to each of them. However, the light intensity profiles from neighboring LEDs overlap in a much more complex way, with potentially 4 or more LEDs having significant contributions to the overall output intensity profile. In one embodiment, the receiver system calculates the centroid of the light distribution due to all incoming light beams, emitted from the neighboring LEDs within a beacon and viewable by the receiver, having significant contribution to the overall output intensity profile. In this example, the calculated centroid is a weighted geometric representation of where a directional line from the receiver to the beacon lies between the neighboring LEDs within a beacon. The output of the centroid calculation is a two-dimensional plot of a single point on a set of axes representing directional angles θ and φ. The coordinates of the single point on the plot represent the desired directional angles θ and φ of the receiver within the three-dimensional operational space.

An unweighted centroid calculation would result in an output plot with the single point located at the geometric center of the LED array, where θ and φ are both equal to 90 degrees as illustrated in FIG. 10B; this result corresponds to the y axis in a 3D system like the one shown in FIG. 8. Unweighted centroid calculation means that the calculation is based solely on system geometry and without accounting for a specific incoming light intensity profile a first beam that may be different than other incoming light intensity profile, i.e. a beam that is higher or lower in intensity as received by the receiver. Naturally, the centroid output in this situation lies at the Geometric Center of the LED array, as labeled in FIG. 10B. On the other hand, a centroid calculation suitably weighted according to a specific light intensity profile would pull the centroid in a direction favoring one or a few of the LEDs that present a higher contribution to the light intensity profile.

As discussed above, since all of the LEDs are mounted on a spherical dome surface, each LED has a slightly different angular orientation predetermined by where it is mounted on the hemispherical surface of the beacon. For objects in front of the beacon and below the xy plane (having a negative z coordinate), φ takes on a value greater than 90°, which also means that LEDs mounted in the top half of the 8×4 array (above the horizontal centerline) are roughly pointing in the direction where the objects are located. Similarly, objects positioned in front of the beacon and above the xy plane (having a positive z coordinate) have a φ direction between 0 and 90°. In such cases, the LEDs positioned in the lower half of the 8×4 array (below the horizontal centerline) are roughly pointing in the direction of the objects. From this, we have a general understanding that the angle φ associated with an LED has a minimum value near the bottom of the array, increasing gradually as one moves up towards the top. Correspondingly, LEDs positioned in the right half of the array (where, in this example, the x coordinate has negative values) start at some minimum value of θ and gradually increase as one moves toward the left end of the array. Given this predetermined position of each LED within the hemispherical dome shape of the beacon, then the directional angles θ and φ can be calculated as discussed above. In addition, the centroid calculation may be conducted in the angle space, so that output of the calculation, i.e. the two coordinates of the centroid, directly results in the desired angles θ and φ and enables the determination of the absolute location in three-dimensional operational space of the receiver. This disclosed concept of location tracking in three-dimensional space can be further extended to include the ability to track additional degrees of freedom of the freely movable object and will be discussed in further detail below.

As discussed above, the calculation the absolute position of a single receiver mounted onto a freely movable object can be determined using a pair of 2D beacons. For certain types of applications, the object's absolute position in three-dimensional operational space is not enough to enable the full range of desired functionality, and the angular orientation—such as pitch, roll and yaw—of the object needs to be determined as well. In one embodiment, the use of multiple receivers mounted, a short distance apart from each other, on a face of the moving object is an approach that can provide the ability to determine three additional degrees of freedom of the moving object, as will be discussed below.

Figure 12:
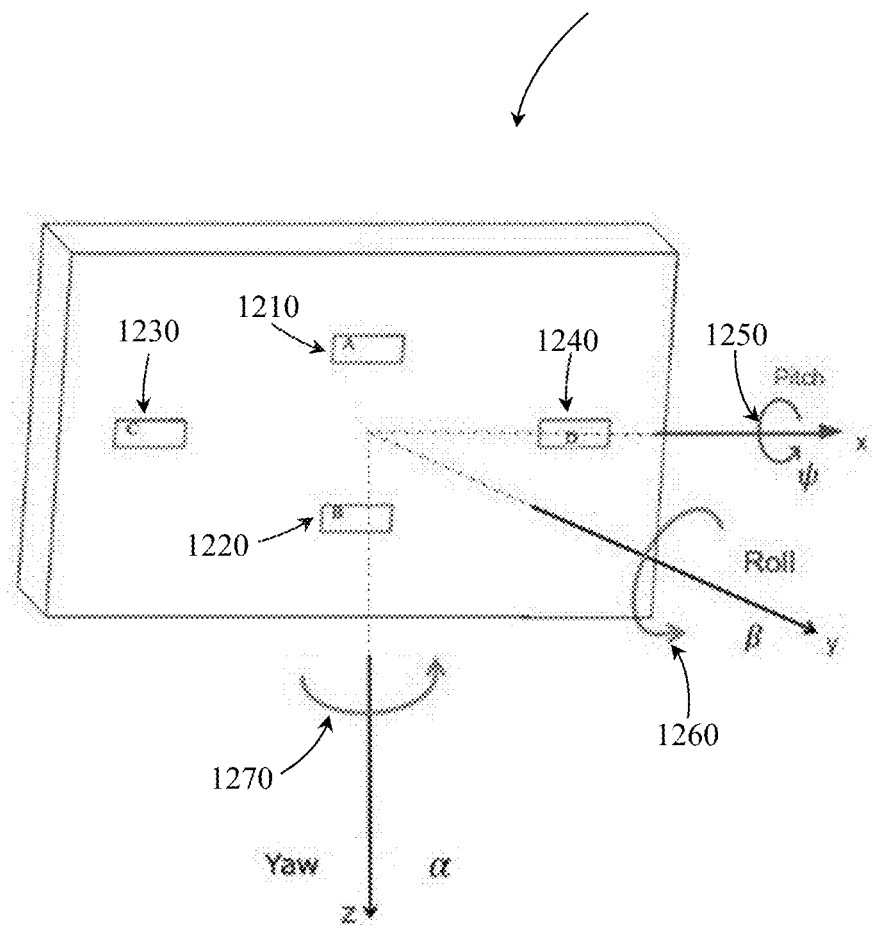
FIG. 12 illustrates four receivers mounted onto an object for tracking pitch, roll and yaw angles in addition to three-dimensional position of the object within a three-dimensional space.

In one embodiment, four receivers are mounted onto a freely moving object are illustrated in FIG. 12. These receivers are used for the purpose of calculating the object's angular orientation about each of the three coordinates axis x, y, and z. This architype of an object with four mounted receivers will be used in a six degrees of freedom location tracking system that will be described in further detail below and is illustrated along with 2D beacons in FIG. 13. The moving object as depicted in FIG. 12 is a rectangular prism, and a first receiver A 1210, a second receiver B 1220, a third receiver C 1230, and a fourth receiver D 1240 are mounted on its outward facing surface. The critical angles defining the object's orientation in pitch ψ 1250, roll β 1260, and yaw a 1270 are labeled about the x-axis, the y-axis, and the z-axis, respectively, as illustrated in FIG. 12.

In one embodiment, the first receiver A 1210 and the second receiver B 1220 are mounted a short distance away from each other along a vertical axis and are used in tandem to calculate the pitch w 1250 of the moving object, which determines the moving object's angular orientation about the x-axis. Similarly, the third receiver C 1230 and the fourth receiver D 1240 are mounted a short distance away from each other along a horizontal axis and are used in tandem to calculate the yaw a 1270 of the moving object, which gives its angular orientation about the z-axis. Lastly, any pair of the first receiver A 1210, the second receiver B 1220, the third receiver C 1230, and the fourth receiver D 1240 whose positions are recorded over a brief interval of time can be used to calculate the roll β 1260 of the moving object, which is its angular orientation about y-axis.

Figure 13:
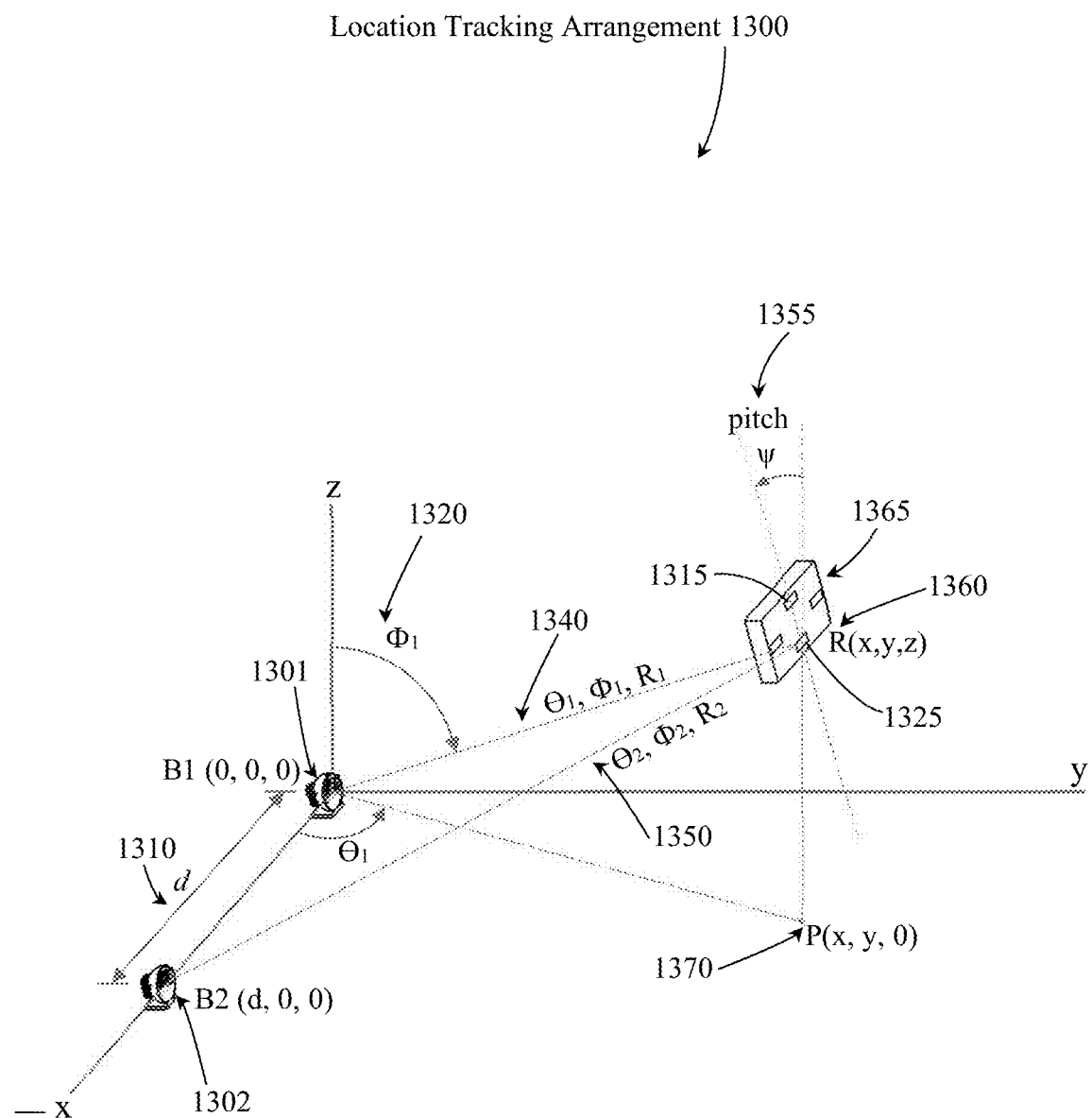
FIG. 13 illustrates a location tracking arrangement of two 2D-beacons and an object having four receivers.

In one embodiment, a Location Tracking Arrangement 1300 is illustrated in FIG. 13 further elucidates the embodiments discussed above for FIG. 12. Here, the whole system is depicted including a first 2D beacon B1 1301 and a second 2D beacon B2 1302, as well as an object with four receivers 1365 located at a point R(x, y, z). The projection of the point R(x, y, z) onto the XY plane is the point P(x, y, 0) 1370, as illustrated FIG. 13, which represents a useful conceptual tool for understanding the relationship between spherical and Cartesian coordinates systems. The object with four receivers 1365 is illustrated with a downward facing orientation corresponding to a pitch angle ψ 1355 of approximately ~25°. For example, the object with four receivers 1365 is rotated so that its front face points downwards at pitch angle ψ 1355. For simplicity and clarity in this example, the roll and yaw angles are not shown in FIG. 13 and set to zero. The pitch angle ψ 1355 can be calculated by comparing the absolute positions of a first receiver A 1315 and a second receiver B 1325, assuming both are receiving signals from at least the first 2D beacon B1 1301 and the second 2D beacon B2 1302 within the operational space. A difference in the y-coordinates of the positions of the first receiver A 1315 and the second receiver B 1325 yields the pitch angle ψ 1355.

In another embodiment, if the first receiver A 1315 and the second receiver B 1325 are receiving light beams from only one beacon, then we can compare the total light beams received at each of the first receiver A 1315 and the second receiver B 1325, and then we can use that as a basis to infer the object's angular orientation pitch ψ 1355. This approach relies on the concept idea that a receiver's distance (away) from a beacon in the radial dimension (R) is given by the total light intensity received from respective LEDs which drops off at a rate of $1/R^2$. In practice, the $1/R^2$ formula represents a maximum output case corresponding to when the one beacon is facing directly toward the first receiver A 1315 and the second receiver B 1325. The calculation of how much the object may be tilted away from the maximum output ($1/R^2$) case relies on second order input phenomena, which typically have weaker signals and a low signal-to-noise ratio. Therefore, the standard approach using two or more beacons may be preferred. In addition, for certain applications a combination computational may be used to further increase accuracy by using the techniques of this embodiment using a single beacon along with the previously discussed embodiment using two beacons.

Although our discussion of FIG. 13 focuses on determining the pitch angle ψ 1355, similar techniques are used to calculate the yaw and roll angles, as described above. These calculations can then be combined to offer the full disposition of the object, in all of its six degrees of freedom.

As disclosed above in previous embodiments and for many applications, it is enough for the beacons to emit light outward from a hemispherical surface in a 180 deg shell covering less than half of the surroundings. For example, if the beacon is placed in a known location with its back to a wall or similarly unimportant surface, it is then assumed that the three-dimensional operation space, where all important tracking activities will be taking place, is within the FOV of the beacon.

In one embodiment and for applications that demand a wider FOV, the beacons can be mounted at certain angles, e.g. perpendicular, to each other so that the set of beacons working together can cover a wider range of space within their FOV. For example, a set of four beacons placed at right angles to each other could be employed, and thus allowing the combined set to cover an entire 360° FOV in azimuth, with sufficient overlap to ensure complete coverage. Additional applications where only location tracking of an object is desired in two-dimensions where for examples the movable object is moving at a certain height throughout the three-dimensional operational space would benefit from the use of single 2D beacon as will be described in further detail below. There is a variety of possible arrangement of beacons that meet other applications' needs, a person can use the techniques disclosed here to build such systems to solve those applications needs.

Figure 14:
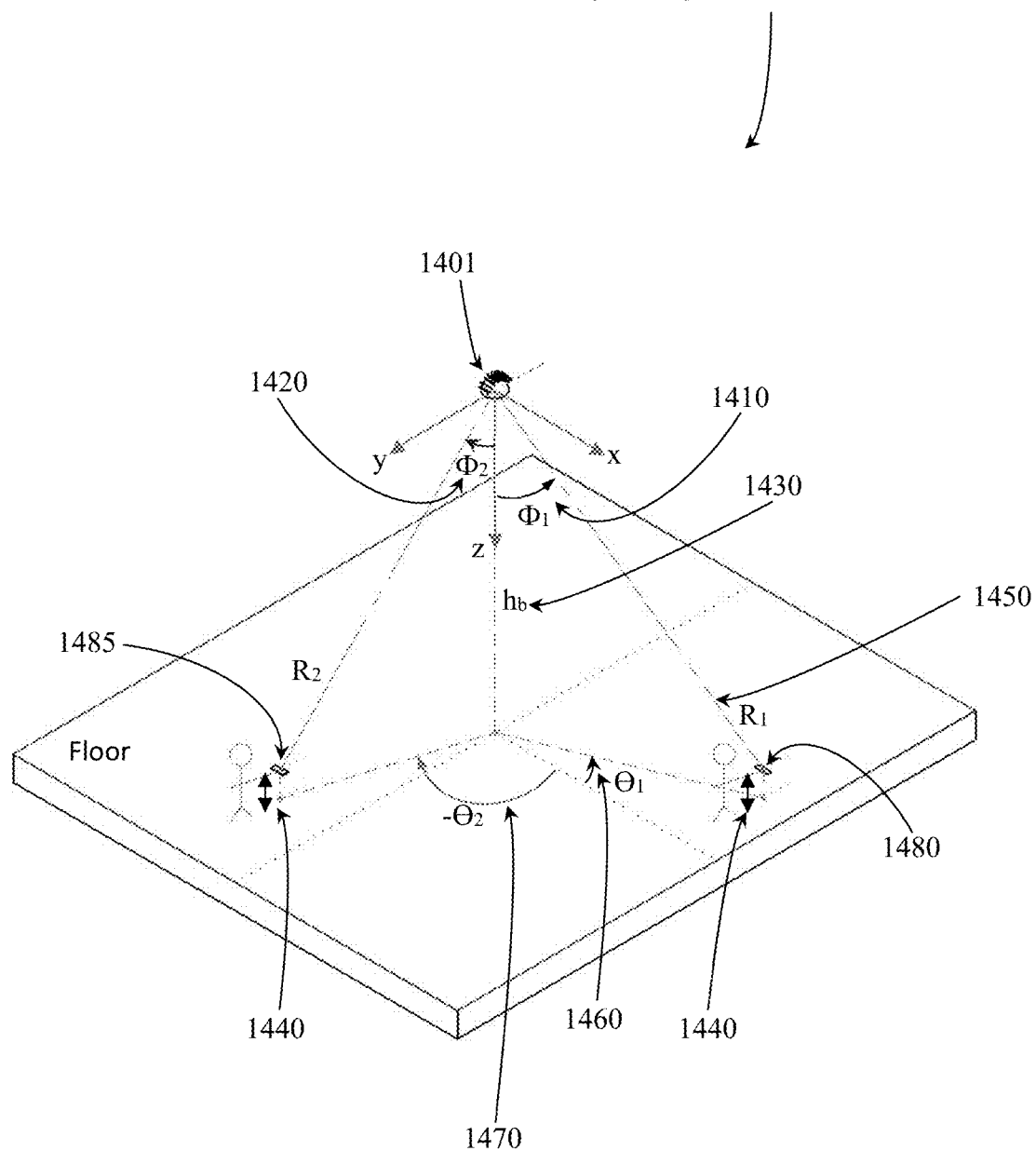
FIG. 14 illustrates a two-dimensional location tracking arrangement of a 2D beacon mounted onto a fixed height $h_b$ in the z-dimension and pointing downwards towards objects moving around in the xy-plane at a fixed height $h_o$ in the z-dimension.

In one embodiment, a two-dimensional location tracking arrangement 1400 is illustrated in FIG. 14, this is a desired location tracking system in such applications where the vertical height of the receivers is assumed to be at a fixed distance from the beacon. In this embodiment, a single 2D beacon 1401, ceiling-mounted, is sufficient to determine the location of a first receiver 1480 and a second receiver 1485 in the x & y directions relevant to the beacon location where the height of the ceiling to the floor is in the z-direction, as illustrated in FIG. 14. The first receiver 1480 and the second receiver 1485 are mounted onto a first and second object, respectively. In addition, the first and second object may be carried by a first and a second user, respectively, while moving around an area such as in a warehouse or a mall. Thus, in this application, the z-dimension is fixed at a predetermined height $h_o$ 1440 above the floor.

The use of multiple 2D beacons and receivers may be combined in a variety of possible scenarios. In one embodiment, the first receiver 1480 is mounted onto a moving object and is assumed to operate at a fixed height $h_o$ 1440 from the floor, and thus $h_o$ 1440 is a known parameter from the outset. As such, only the x and y position of the first receiver 1480 need to be determined, while z-dimension is assumed to be constant. In this case, as shown in FIG. 14, one 2D beacon 1401 mounted in a central location, such as on the ceiling of a room and facing downward, is sufficient to track the first receiver 1480 movement. As illustrated in FIG. 14, the height of the ceiling beacon relative to the floor is given as $h_b$ 1430; accordingly, the z-coordinate of the first receiver 1480 in the system is fixed and can be represented by $h_b - h_o$. As mentioned above, this embodiment is suitable for applications where the object's height is fixed, for example, shopping carts, assembly lines or factory floor, or people holding their smart phone moving about the floor of a grocery store or shopping mall. In this case, each cart or smart phone has a receiver mounted or operating at some fixed height $h_o$, allowing the XY location of the users to be determined with high precision. Furthermore, in such applications where the additional measurement of the angular rotation of the object around the z axis (yaw a) is important to know then it can be determined by placing two or more receivers on the object facing the beacon. Knowing the x and y positions of these receivers can be used to calculate the yaw angle α of the object.

In another embodiment, multiple 2D beacons 1401 can be used to cover a larger area where the object can move across, e.g. a store, a mall, or assembly line, etc., where a receiver would receive light beams from a first 2D beacon and then the receiver transitions to receive light beams from a second 2D beacon as it moves into the coverage area of the second 2D beacon. Similarly, as the receiver continue to move around and continue to transition from one 2D beacon to another neighboring 2D beacon. As the receiver approaches the limit of the FOV of a given 2D beacon, they gradually pass into the FOV of the next beacon. In this way, the whole area of a store or mall can be covered with an array of independent 2D beacons whose identity and location are known to a two-dimensional location tracking system. Furthermore, additional information may be communicated between any two or more components of the two-dimensional tracking system, such as the 2D beacons and the receiver. In one embodiment, it is envisioned that such a system is able not only to track a plurality of receiver but also communicate relevant information to a third party or another application that is tracking the movement of an intended receiver. In another embodiment it is envisioned that the system may communicate relevant information to the user carrying the receiver as it moves close to designated or a predetermined point at an XY location in the room that is known to the system, such as a warning or a marketing information. In each application space, potentially many 2D beacons may be used, e.g. tens or hundreds of 2D beacons.

In one embodiment, calculating the XY location of the first receiver 1480 within the Two-Dimensional Location Tracking Arrangement 1400, which is illustrated in FIG. 14, is discussed in detail below. In this single 2D beacon system example, we consider the following equations which are similar to equation 1 through equation 3 that were previously discussed in the context of a two-beacon system above.

$$x_R = R_1 \cos\theta_1 \sin\varphi_1 \quad \text{Eq. 8}$$

$$y_R = R_1 \sin\theta_1 \sin\varphi_1 \quad \text{Eq. 9}$$

$$z_R = R_1 \cos\varphi_1 \quad \text{Eq. 10}$$

Here, the angular quantities $\theta_1$ 1460 and $\varphi_1$ 1410 are extracted by processing the incoming light beams profile as detected by the first receiver 1480. Furthermore, the z-coordinate of the first receiver 1480 is given by $h_b - h_o$, as discussed above. Thus, $z_R$ can be computed using equation 11 below.

$$z_R = R_1 \cos\varphi_1 = h_b - h_o \quad \text{Eq. 11}$$

Solving for $R_2$, we have:

$$R_1 = \frac{\cos\varphi_1}{h_b - h_0} \quad \text{Eq. 12}$$

Plugging equation 12 back into equations 8 and 9 yields the desired XY location of the first receiver 1480:

$$x_R = \frac{\cos\theta_1 \sin\phi_1 \cos\phi_1}{h_b - h_0} \quad \text{Eq. 13}$$

$$y_R = \frac{\sin\theta_1 \sin\phi_1 \cos\phi_1}{h_b - h_0} \quad \text{Eq. 14}$$

For simplified applications, like the one just described above, one single 2D beacon and one lone receiver having a fixed coordinates in the z-dimension are sufficient to calculate the absolute location of the receiver, the XYZ position, and in turn of the object of interest. Moreover, the use of multiple 2D beacons and multiple receivers mounted onto an object may still be desirable, simply because it can introduce redundancies into the system design, or it can provide additional information to calculate additional angular quantities such as pitch, roll or yaw. For example, adding redundancies help compensate for limitations involved in the practical usage of the system, such as in a particular area the light path is being blocked by an intervening object. Such limitations are likely to occur in real-world situations, and from time to time in the course of tracking any real-world moving object.

As discussed above, a system is disclosed to determine an object location, the system comprising a first beacon located at a first position and a second beacon located at a second position, the first and second beacons are located at a first distance away from each other, each of the first and second beacon has a hemispherical form and includes a plurality of light sources arranged in a first number of row and a first number of columns, each light source of the plurality of light sources (a) is distributed along the hemispherical surface of one of the first and second beacon, and (b) is driven to emit a uniquely encoded light beam; a receiver configured to receive one or more light beams from the first beacon and one or more light beams from the second beam, the receiver computes first and second angular directions of the object relevant to the first beacon based on a first intensity profile of the one or more light beams received from the first beacon, and the receiver computes third and fourth angular directions of the object relevant to the second beacon based on a second intensity profile of the one or more light beams received from the second beacon, wherein the receiver determines the object location within a three-dimensional space based at least in part on the first, second, third, and fourth angular directions, wherein the object location is within the field of view of the first and second beacons.

As discussed above, a system is disclosed to determine an object location, the system comprising a beacon located at a first height, the beacon having a hemispherical form, the beacon includes a plurality of light sources arranged in a first number of row and a first number of columns, each light source of the plurality of light sources is (i) distributed along the hemispherical surface of the beacon, and (ii) driven to emit a uniquely encoded light beam, wherein each light source is positioned onto the hemispherical surface so that its light passed through a focal point of the beacon; a receiver located at a second height, the receiver receives one or more light beams from the beacon, the receiver computes first and second angular directions of the object relevant to the beacon based on an intensity profile of the one or more light beams received from the beacon, wherein the receiver determines the object location based at least in part on the first and second angular directions, and wherein the object location is within the field of view of the beacon.

As discussed above, a system is disclosed to determine an object location, the system comprising a first beacon located at a first position and a second beacon located at a second position, the first and second beacons are located at a first distance away from each other, each of the first and second beacon has a hemispherical form and includes a plurality of light sources arranged in a first form, wherein the first form is selected from a two-dimensional array of rows and columns, an array having hexagonal shape, an array having a circular shape, and an array having a polygon shape, each light source of the plurality of light sources (a) is distributed along the hemispherical surface of one of the first and second beacon, and (b) is driven to emit a uniquely encoded light beam; a receiver configured to receive one or more light beams from the first beacon and one or more light beams from the second beam, the receiver computes first and second angular directions of the object relevant to the first beacon based on a first intensity profile of the one or more light beams received from the first beacon, and the receiver computes third and fourth angular directions of the object relevant to the second beacon based on a second intensity profile of the one or more light beams received from the second beacon, wherein the receiver determines the object location within a three-dimensional space based at least in part on the first, second, third, and fourth angular directions, wherein the object location is within the field of view of the first and second beacons.

We claim:

1. A system for location tracking of a movable object, the system comprising:
    a first beacon located at a first fixed position and configured to emit a first plurality of encoded light beams each emitted from a corresponding light source of a first plurality of light sources; and
    a second beacon located at a second fixed position and configured to emit a second plurality of encoded light beams each emitted from a corresponding light source of a second plurality of light sources, wherein,
    the first and second beacons are positioned at a first distance away from each other, the first beacon includes a first concave surface, the first plurality of light sources are positioned alongside the first concave surface, the second beacon includes a second concave surface, and the second plurality of light sources are positioned alongside the second concave surface,
    a receiver is mounted on the movable object, the receiver is configured (i) to receive one or more encoded light beams of the first plurality of encoded light beams from the first beacon, and (ii) to receive one or more encoded light beams of the second plurality of encoded light beams from the second beacon,
    in response to the one or more encoded light beams received from the first beacon, the receiver is configured to decode a first set of information and to determine a first angular direction of the movable object based on the first set of information,
    in response to the one or more encoded light beams received from the second beacon, the receiver is configured to decode a second set of information and to determine a second angular direction of the movable object based on the second set of information, and
    the receiver is configured to determine a first location of the movable object based at least in part on the first and second angular directions.

2. The system of claim 1, wherein the first set of information includes information related to any one or more of the first fixed position, the first concave surface, and a respective position of a respective light source of the first plurality of light sources along the first concave surface of the first beacon.

3. The system of claim 1, wherein the first location of the movable object is within a first three-dimensional space that is in the field of view of the first and second beacons.

4. The system of claim 1, wherein the first plurality of encoded light beams emitted from the first beacon define a first set of angular planes, and the second plurality of encoded light beams emitted from the second beacon define a second set of angular planes, and wherein the first set of angular planes is perpendicular to the second set of angular planes.

5. The system of claim 1, wherein the receiver is configured to determine the first angular direction of the movable object based on the first set of information and a first intensity profile of the one or more encoded light beams of the first plurality of encoded light beams received from the first beacon, and wherein the receiver is configured to determine the second angular direction of the movable object based on the second set of information and a second intensity profile of the one or more encoded light beams of the second plurality of encoded light beams received from the second beacon.

6. The system of claim 1 further comprising:
    a first apodizing slit located at a first position in front of the first concave surface of the first beacon; and
    a second apodizing slit located at a second position in front of the second concave surface of the second beacon,
    wherein the first plurality of encoded light beams, emitted from the first plurality of light sources of the first beacon, is transmitted through the first apodizing slit towards a three-dimensional space, and
    wherein the second plurality of encoded light beams, emitted from the second plurality of light sources of the second beacon, is transmitted through the second apodizing slit towards the three-dimensional space.

7. The system of claim 6, wherein the receiver is configured to determine a location of the movable object within the three-dimensional space.

8. The system of claim 6, wherein both the first concave surface and the second concave surface conform to any one of a cylindrical form, a circular form, and a parabola form.

9. The system of claim 6, wherein the first apodizing slit is positioned at a focal point of the first concave surface.

10. The system of claim 6, wherein the second apodizing slit is positioned at a focal point of the second concave surface.

11. The system of claim 1 further comprising:
    a third beacon located at a third fixed position and configured to emit a third plurality of encoded light beams, wherein each respective encoded light beam of the third plurality of encoded light beams is emitted from a respective light source of a third plurality of light sources, the third beacon is positioned at a second distance away from the first beacon and at a third distance away from the second beacon, the third beacon includes a third concave surface and the third plurality of light sources are positioned alongside the third concave surface, wherein, the receiver is further configured (i) to receive one or more encoded light beams of the third plurality of encoded light beams from the third beacon, (ii) to determine a third angular direction of the movable object based on a third set of information decoded from the one or more encoded light beams received from the third beacon, and (iii) to determine a second location of the movable object based at least in part on the first, second, and third angular directions.

12. The system of claim 11, wherein the third plurality of encoded light beams emitted from the third beacon define a third set of angular planes that are perpendicular to a first set of angular planes defined by the first plurality of encoded light beams or a second set of angular planes defined by the second plurality of encoded light beams.

13. The system of claim 1, wherein the second set of information includes information related to any one or more of the second fixed position, the second concave surface, and a respective position of a respective light source of the second plurality of light sources along the second concave surface of the second beacon.

14. A system for tracking a movable object within a three-dimensional space, the system comprising:
a first beacon including a first concave surface and a first apodizing slit, the first beacon is placed at a first fixed location, the first beacon includes a first plurality of light sources, each light source of the first plurality of light sources is placed onto a respective position along the first concave surface, the first beacon is configured to emit a first plurality of encoded light beams through the first apodizing slit towards the three-dimensional space, wherein each respective encoded light beam of the first plurality of encoded light beams is emitted from a respective light source of the first plurality of light sources;
a second beacon including a second concave surface and a second apodizing slit, the second beacon is placed at a second fixed location, the second beacon includes a second plurality of light sources, each light source of the second plurality of light sources is placed onto a respective position along the second concave surface, the second beacon is configured to emit a second plurality of encoded light beams through the second apodizing slit towards the three-dimensional space, wherein each respective encoded light beam of the second plurality of encoded light beams is emitted from a respective light source of the second plurality of light sources; and
a receiver configured (i) to receive a first encoded light beam of the first plurality of encoded light beams, and to decode a first set of information from the first encoded light beam, (ii) to receive a second encoded light beam of the second plurality of encoded light beams, and to decode a second set of information from the second encoded light beam, (iii) to generate a first angular direction of the movable object relevant to the first beacon based on the first set of information, (iv) to generate a second angular direction of the movable object relevant to the second beacon based on the second set of information, and (v) determine a location of the movable object within the three-dimensional space based at least in part on the first and second angular directions.

15. The system of claim 14, wherein the receiver is configured to decode the first set of information from the received first encoded light beam based on a first intensity profile of the received first encoded light beam.

16. The system of claim 15, wherein the receiver is further configured to decode the second set of information from the received second encoded light beam based on a second intensity profile of the received second encoded light beam.

17. A system for tracking a movable object within a three-dimensional space, the system comprising:
a first beacon having a first concave surface and placed at a first fixed location, the first beacon having a first plurality of light sources distributed at regular intervals along the first concave surface, the first beacon is configured to emit a first light beam, the first light beam is encoded with a first set of information associated with a first light source of the first plurality of light sources;
a second beacon having a second concave surface and placed at a second fixed location, the second beacon having a second plurality of light sources distributed at regular intervals along the second concave surface, the second beacon is configured to emit a second light beam, the second light beam is encoded with a second set of information associated with a second light source of the second plurality of light sources;
a third beacon having a third concave surface and placed at a third fixed location, the third beacon having a third plurality of light sources distributed at regular intervals along the third concave surface, the third beacon is configured to emit a third light beam, the third light beam is encoded with a third set of information associated with a third light source of the third plurality of light sources;
a fourth beacon having a fourth concave surface and placed at a fourth fixed location, the fourth beacon having a fourth plurality of light sources distributed at regular intervals along the fourth concave surface, the fourth beacon is configured to emit a fourth light beam, the fourth light beam is encoded with a fourth set of information associated with a fourth light source of the fourth plurality of light sources, wherein the first, second, third and fourth beacons are placed at right angles with respect to each other;
a receiver configured (i) to receive the first, second, third, and fourth light beams, (ii) to generate a first, second, third, and fourth angular directions relative to the first, second, third and fourth fixed location, respectively, and (iii) to determine a first location of the movable object within the three-dimensional space based at least in part on the first, second, third, and a fourth angular directions.

18. The system of claim 17, wherein the first set of information includes one or more attributes related to any one or more of the first fixed location, a first placement location of the first light source on the first concave surface, the second set of information includes one or more attributes related to any one or more of the second fixed location, a second placement location of the second light source on the second concave surface, the third set of information includes one or more attributes related to any one or more of the third fixed location, a third placement location of the third light source on the third concave surface, and the fourth set of information includes one or more attributes related to any one or more of the fourth fixed location, a fourth placement location of the fourth light source on the fourth concave surface.

19. The system of claim 17, wherein the receiver is configured (i) to generate the first angular directions based on a first intensity profile of the received first light beam, (ii) to generate the second angular directions based on a second intensity profile of the received second light beam, (iii) to generate the third angular directions based on a third intensity profile of the received third light beam, and (iv) to generate the fourth angular direction based on a fourth intensity profile of the received fourth light beam.

20. The system of claim 17, wherein the receiver is configured to track the movable object within a field of view of 360° in azimuth within the three-dimensional space based on the first, second, third, and a fourth angular directions.

\* \* \* \* \*